(12) United States Patent
Zumbrum et al.

(10) Patent No.: US 11,173,635 B2
(45) Date of Patent: Nov. 16, 2021

(54) FLUID TRANSFER ASSEMBLY, A FLUID TRANSFER SYSTEM, AND A RELATED METHOD

(71) Applicant: Sartorius Stedim North America Inc., Bohemia, NY (US)

(72) Inventors: Michael A. Zumbrum, New Oxford, PA (US); Charles Meadows, Phoenixville, PA (US); Kevin Perdue, Havre de Grace, MD (US)

(73) Assignee: Sartorius Stedim North America Inc., Bohemia, NY (US)

( * ) Notice: Subject to any disclaimer, the term of this patent is extended or adjusted under 35 U.S.C. 154(b) by 0 days.

(21) Appl. No.: 16/495,440

(22) PCT Filed: Dec. 20, 2017

(86) PCT No.: PCT/US2017/067483
§ 371 (c)(1),
(2) Date: Sep. 19, 2019

(87) PCT Pub. No.: WO2018/174977
PCT Pub. Date: Sep. 27, 2018

(65) Prior Publication Data
US 2020/0061873 A1 Feb. 27, 2020

Related U.S. Application Data

(63) Continuation of application No. PCT/IB2017/051607, filed on Mar. 20, 2017.

(51) Int. Cl.
*B29C 37/00* (2006.01)
*B67D 7/02* (2010.01)
(Continued)

(52) U.S. Cl.
CPC ........ *B29C 37/0017* (2013.01); *B29C 33/505* (2013.01); *B29C 39/10* (2013.01);
(Continued)

(58) Field of Classification Search
None
See application file for complete search history.

(56) References Cited

U.S. PATENT DOCUMENTS

| 2,226,312 A | 12/1940 | Kuhns |
| 3,360,008 A | 12/1967 | Papale et al. |

(Continued)

FOREIGN PATENT DOCUMENTS

| CN | 101313168 | 11/2008 |
| CN | 203641744 | 6/2014 |

(Continued)

OTHER PUBLICATIONS

European Extended Search Report for EP17902105.0, dated Dec. 23, 2020, 6 pgs.
(Continued)

*Primary Examiner* — Benjamin A Schiffman
(74) *Attorney, Agent, or Firm* — Womble Bond Dickinson (US) LLP

(57) ABSTRACT

Fluid transfer assemblies for transferring fluid into or out of a single vessel and distributing the fluid to multiple other vessels are provided. The fluid transfer assemblies are customizable, substantially aseptic, and single-use. The fluid transfer assemblies may be manufactured by solidifying polymeric materials to form a body around a mandrel with protrusions engaged to fluid conduits and leaving recesses in the solidified polymeric material to stretch the resultant body and remove the mandrel with protrusions. The resultant fluid transfer assembly may be surrounded by a rigid housing and (Continued)

valves may be engaged with the conduits and/or body to control the fluid flow within the fluid transfer assembly.

23 Claims, 27 Drawing Sheets

(51) Int. Cl.

| | | |
|---|---|---|
| *B29C 33/50* | (2006.01) | |
| *B29C 65/70* | (2006.01) | |
| *B29D 23/00* | (2006.01) | |
| *B29C 39/10* | (2006.01) | |
| *B29C 39/34* | (2006.01) | |
| *B29C 39/36* | (2006.01) | |
| *B29C 33/00* | (2006.01) | |
| *B29K 19/00* | (2006.01) | |
| *B29L 23/00* | (2006.01) | |
| *B29C 33/12* | (2006.01) | |
| *B29C 33/44* | (2006.01) | |
| *B29K 83/00* | (2006.01) | |
| *B29L 31/24* | (2006.01) | |

(52) U.S. Cl.
CPC ............ *B29C 39/34* (2013.01); *B29C 39/36* (2013.01); *B29C 65/70* (2013.01); *B29D 23/00* (2013.01); *B29C 33/0033* (2013.01); *B29C 33/12* (2013.01); *B29C 33/44* (2013.01); *B29K 2019/00* (2013.01); *B29K 2083/00* (2013.01); *B29L 2023/00* (2013.01); *B29L 2031/24* (2013.01); *B67D 7/0294* (2013.01); *B67D 2210/0006* (2013.01)

(56) References Cited

U.S. PATENT DOCUMENTS

| | | |
|---|---|---|
| 3,458,619 A | 7/1969 | Prochaska |
| 5,245,955 A | 9/1993 | Husted |
| 5,441,197 A | 8/1995 | Gellert et al. |
| 7,686,037 B2 | 3/2010 | Krywitsky |
| 7,708,923 B1 | 5/2010 | Helicke et al. |
| 2008/0277926 A1 | 11/2008 | Inman, Jr. et al. |
| 2011/0155274 A1 | 6/2011 | Zumbrum |

FOREIGN PATENT DOCUMENTS

| | | |
|---|---|---|
| WO | WO2015/84388 A1 | 6/2015 |
| WO | WO2018/172811 A1 | 9/2018 |
| WO | WO2018/174977 A1 | 9/2018 |

OTHER PUBLICATIONS

Chinese Office Action for CN201780088678.1, dated Nov. 20, 2020, 17 pgs.
International Search Report and the Written Opinion of the International Searching Authority for PCT/IB2017/051607; dated Dec. 4, 2017.
International Search Report and the Written Opinion of the International Searching Authority for PCT/US2017/067483; dated Apr. 20, 2018.
International Preliminary Report on Patentability for PCT/US2017/067483; dated Oct. 3, 2019.
VIPERPERFORMANCEUK; How it's made: Silicone Hoses manufacturing by Viper Performance; https://www.youtube.com/watch?v=iuO0TdzHnWo>5:30-6:30; dated Oct. 1, 2014.
Chinese Office Action for App. No. 201780088678.1, dated Jun. 8, 2021, 6 pgs.

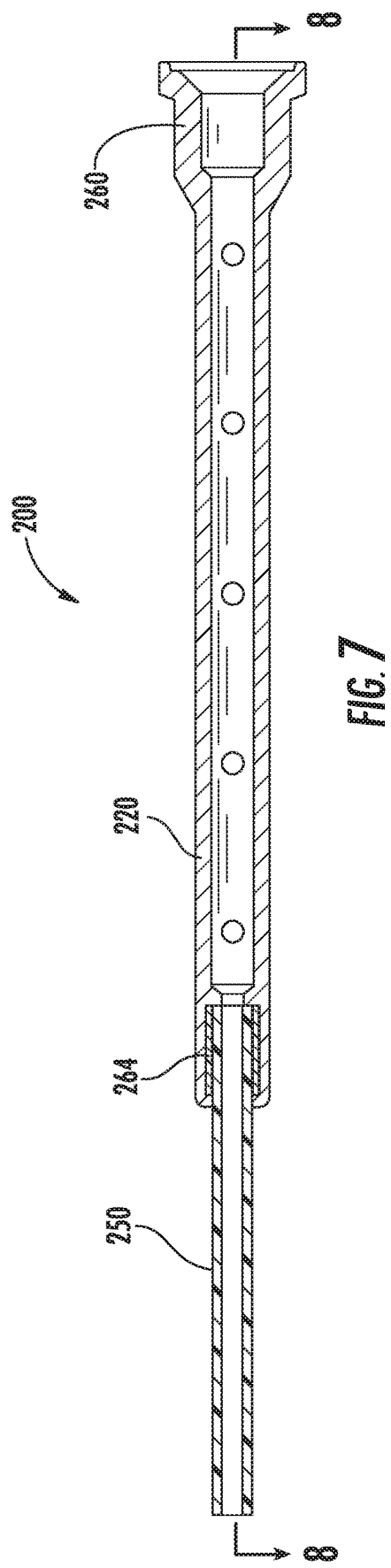

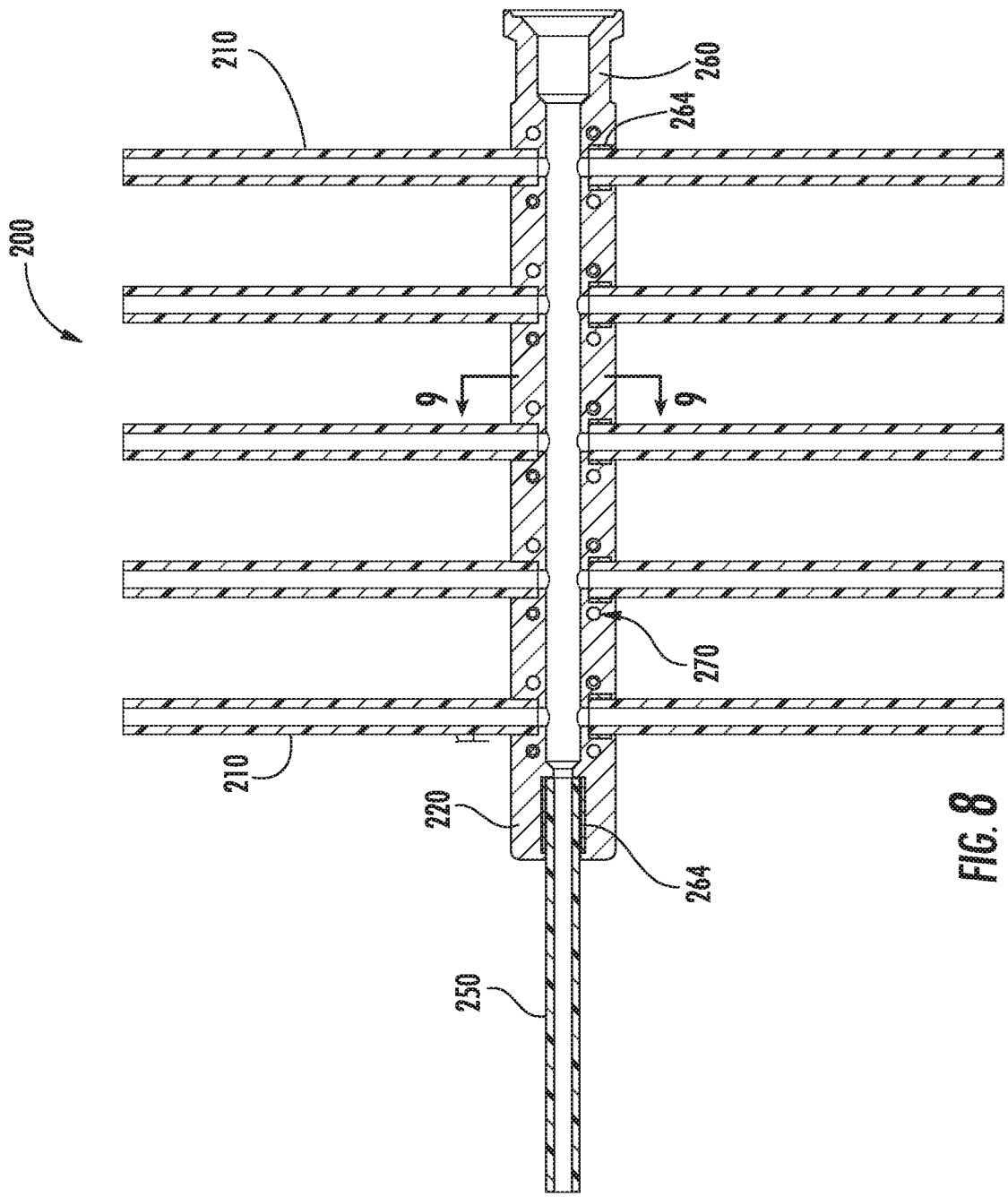

FLUID TRANSFER ASSEMBLY, A FLUID TRANSFER SYSTEM, AND A RELATED METHOD

TECHNICAL FIELD

This disclosure relates generally to a fluid transfer assembly allowing for the transfer of fluids and, more specifically, to a fluid transfer assembly for use in distributing fluids comprising a body and conduits allowing for the transfer of fluid through the assembly to multiple fluid vessels.

BACKGROUND

During certain manufacturing processes, fluids are created that need to be distributed from one vessel, to multiple other vessels. Often it is necessary to transfer fluid out of a single manufacturing vessel to multiple storage or distribution vessels. In particular, the need to transfer fluid in such a manner often arises in the manufacturing and processing of pharmaceuticals, biopharmaceuticals, or other biotechnology applications where processes are conducted in vessels of varying shapes and sizes. The need for fluid transfer to or from a vessel arises in other applications and industries as well, including but not limited to, the production of food, cosmetics, paint, chemicals, including hazardous chemicals, and the transfer and handling of semiconductor fluids.

Regardless of the industry, in some aspects, during transfers or sampling, the fluid often needs to be transferred to or from a vessel or container where a manufacturing process has occurred, such as fermentation, to or from multiple smaller vessels for storage or further distribution. The vessel where the manufacturing has occurred is often larger than the storage and distribution vessels and thus there is a need to transfer substantial volumes of fluid into many smaller vessels for storage or further distribution. In addition, when making such transfers, it may be desirable to distribute the fluid to multiple storage or distribution containers simultaneously. To accomplish an efficient and substantially aseptic transfer of fluids from a single vessel to multiple other vessels, it is desirable to control the environment through which the fluid flows. For example, the pathway from a manufacturing vessel to a storage or distribution container should be substantially aseptic along the entire pathway. Furthermore, it may be desirable that the fluid transfer assembly be safe for use, reliable, and of relatively low-cost construction.

Further, it is desirable to transfer fluid using a fluid transfer assembly that is simple to manufacture and adaptable to a variety of needs. For example, an end user may need to transfer fluids from a manufacturing vessel to any number of storage, sampling, or distribution containers. Accordingly, it may be desirable for a fluid transfer assembly to be customizable so that the end user can tailor the assembly to a particular manufacturing need. Of particular interest is a fluid transfer assembly that may be manufactured with a variety of materials to handle a variety of fluid types.

It may also be desirable for a fluid transfer assembly to be manufactured in as few steps as possible, while still allowing for customization.

It may also be desirable to transfer fluid using a single-use fluid transfer assembly that is pre-sterilized. A pre-sterilized, single-use fluid transfer assembly avoids the need for a bioprocess operator or end-user to assemble and to sterilize the assembly for use.

Thus, a fluid transfer assembly that is relatively simple to manufacture, customizable with respect to both the materials used as well as the number of conduits provided and as to fluid control devices, and one that is single-use, substantially aseptic, and relatively inexpensive is needed.

SUMMARY

Briefly described, there is a method of forming a fluid transfer assembly, comprising engaging one or more protrusions extending outwardly from a mandrel with one or more fluid conduits; positioning the mandrel with the one or more protrusions engaging the conduits into a mold; introducing a polymeric material into the mold to substantially surround the mandrel and at least a portion of the conduits engaged with the one or more protrusions; solidifying the polymeric material in the mold to define a fluid transfer assembly comprising a body portion engaged with the conduits; removing the fluid transfer assembly from the mold; stretching the body portion into an elongated state; removing the mandrel with the one or more protrusions from the fluid transfer assembly; and relaxing the fluid transfer assembly into an unelongated state from the elongated state such that a fluid channel in fluid communication with the one or more conduits is formed within the body portion.

In another embodiment, there is disclosed a fluid transfer system comprising a mandrel with one or more protrusions extending outwardly therefrom; one or more fluid conduits configured to engage the one or more protrusions of the mandrel; a mold configured to receive the mandrel and the one or more protrusions therein; polymeric material configured to be introduced into the mold and substantially surround the mandrel and at least a portion of the conduits engaged with the one or more protrusions; and a solidifying mechanism configured to solidify the polymeric material in the mold to define a body portion engaged with the conduits having an elongation to break of between about 150% and about 1,500%.

In another embodiment, there is disclosed a fluid transfer assembly comprising one or more fluid conduits; an body portion engaged with the conduits and defining a fluid channel within the body portion in fluid communication with the one or more conduits when the body portion is in an unelongated state, the body portion having an elongation to break of between about 150% and about 1,500%.

Thus, fluid transfer assemblies, fluid transfer assembly systems, and methods for production thereof are disclosed that possess distinct attributes and represent distinct improvements. These and other aspects, features, and advantages of the fluid assemblies of this disclosure, and the methods of manufacture thereof, will be better understood and appreciated upon review of the detailed description set forth below when taken in conjunction with the accompanying drawing figures, described briefly below. According to common practice, the various features of the drawings may not be drawn to scale. Dimensions and relative sizes of various features and elements in the drawings may be shown enlarged or reduced to illustrate more clearly the embodiments of the invention.

The present disclosure thus includes, without limitation, the following embodiments.

Embodiment 1: A method of forming a fluid transfer assembly comprising: engaging one or more protrusions extending outwardly from a mandrel with one or more fluid conduits; positioning the mandrel with the one or more protrusions engaging the conduits into a mold; introducing a polymeric material into the mold to substantially surround the mandrel and at least a portion of the conduits engaged with the one or more protrusions; solidifying the polymeric material in the mold to define a fluid transfer assembly comprising a body portion engaged with the conduits; removing the fluid transfer assembly from the mold; stretching the body portion into an elongated state; removing the mandrel with the one or more protrusions from the fluid transfer assembly; and relaxing the fluid transfer assembly into an unelongated state from the elongated state such that a fluid channel in fluid communication with the one or more conduits is formed within the body portion.

Embodiment 2: The method of any preceding or subsequent embodiment, or combinations thereof, wherein removing the mandrel and the one or more protrusions comprises stretching the body portion via one or more internal recesses defined by the body portion that enable the body portion to be stretched from the unelongated state into the elongated state and subsequently pulling the mandrel to remove the mandrel with the one or more protrusions from the fluid transfer assembly.

Embodiment 3: The method of any preceding or subsequent embodiment, or combinations thereof, comprising positioning sleeves in the mold prior to introducing the polymeric material into the mold, the sleeves defining the one or more internal recesses in the body portion upon removing the fluid transfer assembly from the mold.

Embodiment 4: The method of any preceding or subsequent embodiment, or combinations thereof, further comprising attaching a collar around an end of at least one of the one or more fluid conduits prior to the step of introducing the polymeric material.

Embodiment 5: The method of any preceding or subsequent embodiment, or combinations thereof, wherein the polymeric material of the body portion is introduced in order to at least partially cover the collar.

Embodiment 6: The method of any preceding or subsequent embodiment, or combinations thereof, wherein the polymeric material of the body portion is introduced in order to substantially entirely cover the collar.

Embodiment 7: The method of any preceding or subsequent embodiment, or combinations thereof, wherein the at least one of the one or more fluid conduits is a thermoplastic conduit, and the polymeric material is a thermoset, wherein the collar is configured to attach the thermoplastic conduit into the thermoset body portion.

Embodiment 8: The method of any preceding or subsequent embodiment, or combinations thereof, wherein the at least one of the one or more fluid conduits is a thermoplastic conduit, and the polymeric material is a thermos plastic, wherein the collar is configured to attach the thermoplastic conduit into the thermoplastic body portion.

Embodiment 9: The method of any preceding or subsequent embodiment, or combinations thereof, wherein the at least one of the one or more fluid conduits is a thermoset conduit, and the polymeric material is a thermoplastic, wherein the collar is configured to attach the thermoset conduit into the thermoplastic body portion.

Embodiment 10: The method of any preceding or subsequent embodiment, or combinations thereof, wherein the at least one of the one or more fluid conduits is a thermoset conduit, and the polymeric material is a thermoset, wherein the collar is configured to attach the thermoset conduit into the thermoset body portion.

Embodiment 11: The method of any preceding or subsequent embodiment, or combinations thereof, further comprising providing an adhesive between the collar and the fluid conduit.

Embodiment 12: The method of any preceding or subsequent embodiment, or combinations thereof, wherein the fluid conduit is a thermoset material.

Embodiment 13: The method of any preceding or subsequent embodiment, or combinations thereof, wherein the fluid conduit is a thermoplastic material.

Embodiment 14: The method of any preceding or subsequent embodiment, or combinations thereof, further comprising applying a primer to an exterior of the collar.

Embodiment 15: The method of any preceding or subsequent embodiment, or combinations thereof, wherein solidifying the polymeric material comprises curing the polymeric material having an elongation to break of between about 150% and about 1,500%.

Embodiment 16: The method of any preceding or subsequent embodiment, or combinations thereof, wherein the one or more protrusions comprise a length less than or equal to a diameter of the mandrel.

Embodiment 17: The method of any preceding or subsequent embodiment, or combinations thereof, wherein the polymeric material is a thermoplastic.

Embodiment 18: The method of any preceding or subsequent embodiment, or combinations thereof, wherein the polymeric material is a thermoset.

Embodiment 19: The method of any preceding or subsequent embodiment, or combinations thereof, wherein the polymeric material is a silicone elastomer.

Embodiment 20: The method of any preceding or subsequent embodiment, or combinations thereof, wherein the polymeric material is a perfluoropolyether elastomer.

Embodiment 21: The method of any preceding or subsequent embodiment, or combinations thereof, comprising securing at least a portion of the fluid transfer assembly into a rigid housing.

Embodiment 22: The method of any preceding or subsequent embodiment, or combinations thereof, wherein a material of the rigid housing is selected from the group consisting of polyether sulfone, polyester, polycarbonate, polyamide, polyetherimide, polyether ether ketone, polyolefins, ethylene tetrafluoro ethylene, aluminum, stainless steel, carbon fiber epoxy, and glass filled plastics.

Embodiment 23: The method of any preceding or subsequent embodiment, or combinations thereof, comprising engaging one or more fluid control devices with at least one of the conduits and the body portion, and the housing to control fluid flow within the fluid transfer assembly.

Embodiment 24: A fluid transfer system comprising: a mandrel with one or more protrusions extending outwardly therefrom; one or more fluid conduits configured to engage the one or more protrusions of the mandrel; a mold configured to receive the mandrel and the one or more protrusions therein; polymeric material configured to be introduced into the mold and substantially surround the mandrel and at least a portion of the conduits engaged with the one or more protrusions; and a solidifying mechanism configured to solidify the polymeric material in the mold to define a body portion engaged with the conduits having an elongation to break of between about 150% and about 1,500%.

Embodiment 25: The system of any preceding or subsequent embodiment, or combinations thereof, wherein the solidified polymeric material is configured to be stretched into an elongated state while the mandrel is configured to be subsequently pulled in order to remove the mandrel with the one or more protrusions from the fluid transfer assembly.

Embodiment 26: The system of any preceding or subsequent embodiment, or combinations thereof, wherein the one or more protrusions comprise a length less than or equal to a diameter of the mandrel.

Embodiment 27: The system of any preceding or subsequent embodiment, or combinations thereof, wherein the polymeric material is a thermoplastic.

Embodiment 28: The system of any preceding or subsequent embodiment, or combinations thereof, wherein the polymeric material is a thermoset.

Embodiment 29: The system of any preceding or subsequent embodiment, or combinations thereof, wherein the polymeric material is a silicone elastomer.

Embodiment 30: The system of any preceding or subsequent embodiment, or combinations thereof, comprising a housing configured to receive at least a portion of the body portion and at least a portion of the conduits.

Embodiment 31: The system of any preceding or subsequent embodiment, or combinations thereof, wherein the housing comprises a rigid material.

Embodiment 32: The system of any preceding or subsequent embodiment, or combinations thereof, comprising one or more fluid control devices configured to be engaged with at least one of the conduits and the body portion, and the housing to control fluid flow within the fluid transfer assembly.

Embodiment 33: The system of any preceding or subsequent embodiment, or combinations thereof, comprising a sleeve positioned in the mold to define the one or more internal recesses in the body portion upon removal of the fluid transfer assembly from the mold.

Embodiment 34: The system of any preceding or subsequent embodiment, or combinations thereof, further comprising a collar attached around an end of at least one of the one or more fluid conduits.

Embodiment 35: The system of any preceding or subsequent embodiment, or combinations thereof, wherein the polymeric material is configured to at least partially cover the collar.

Embodiment 36: The system of any preceding or subsequent embodiment, or combinations thereof, wherein the polymeric material is configured to substantially entirely cover the collar.

Embodiment 37: The system of any preceding or subsequent embodiment, or combinations thereof, wherein the at least one of the one or more fluid conduits is a thermoplastic conduit, and the polymeric material is a thermoset.

Embodiment 38: The system of any preceding or subsequent embodiment, or combinations thereof, wherein the at least one of the one or more fluid conduits is a thermoplastic conduit, and the polymeric material is a thermoplastic.

Embodiment 39: The system of any preceding or subsequent embodiment, or combinations thereof, wherein the at least one of the one or more fluid conduits is a thermoset conduit, and the polymeric material is a thermoset.

Embodiment 40: The system of any preceding or subsequent embodiment, or combinations thereof, wherein the at least one of the one or more fluid conduits is a thermoset conduit, and the polymeric material is a thermoplastic.

Embodiment 41: The system of any preceding or subsequent embodiment, or combinations thereof, further comprising providing an adhesive between the collar and the fluid conduit.

Embodiment 42: The system of any preceding or subsequent embodiment, or combinations thereof, wherein the fluid conduit is a thermoset material.

Embodiment 43: The system of any preceding or subsequent embodiment, or combinations thereof, wherein the fluid conduit is a thermoplastic material.

Embodiment 44: The system of any preceding or subsequent embodiment, or combinations thereof, comprising a primer on an exterior of the collar.

Embodiment 45: A fluid transfer assembly comprising: one or more fluid conduits; a body portion engaged with the conduits and defining a fluid channel within the body portion in fluid communication with the one or more conduits when the body portion is in an unelongated state, the body portion having an elongation to break of between about 150% and about 1,500%.

Embodiment 46: The assembly of any preceding or subsequent embodiment, or combinations thereof, wherein the body portion defines one or more internal recesses that enable the body portion to be stretched from the unelongated state to an elongated state to remove a mandrel and one or more protrusions extending outwardly therefrom from the fluid transfer assembly.

Embodiment 47: The assembly of any preceding or subsequent embodiment, or combinations thereof, wherein the one or more internal recesses are defined by sleeves positioned in the mold to define the one or more internal recesses in the body portion upon removal of the fluid transfer assembly from the mold.

Embodiment 48: The assembly of any preceding or subsequent embodiment, or combinations thereof, wherein the body portion or the one or more fluid conduits comprises a polymeric material.

Embodiment 49: The assembly of any preceding or subsequent embodiment, or combinations thereof, wherein the polymeric material comprises at least one of a thermoplastic conduit, a thermoset conduit, and a silicone elastomer body portion.

Embodiment 50: The assembly of any preceding or subsequent embodiment, or combinations thereof, wherein the one or more protrusions comprises a length less than or equal to a diameter of the mandrel.

Embodiment 51: The assembly of any preceding or subsequent embodiment, or combinations thereof, comprising a housing configured to receive at least a portion of the body portion and at least a portion of the one or more conduits.

Embodiment 52: The assembly of any preceding or subsequent embodiment, or combinations thereof, wherein the housing comprises a rigid material.

Embodiment 53: The assembly of any preceding or subsequent embodiment, or combinations thereof, comprising one or more fluid control devices configured to be engaged with at least one of the one or more conduits and the body portion, and the housing to control fluid flow within the fluid transfer assembly.

Embodiment 54: The assembly of any preceding or subsequent embodiment, or combinations thereof, further comprising a collar attached around an end of at least one of the one or more fluid conduits adjacent to the fluid channel.

Embodiment 55: The assembly of any preceding or subsequent embodiment, or combinations thereof, wherein the polymeric material is configured to at least partially cover the collar.

Embodiment 56: The assembly of any preceding or subsequent embodiment, or combinations thereof, wherein the polymeric material is configured to substantially entirely cover the collar.

Embodiment 57: The assembly of any preceding or subsequent embodiment, or combinations thereof, wherein the at least one of the one or more fluid conduits is a thermoplastic conduit, and the polymeric material is a thermoset.

Embodiment 58: The assembly of any preceding or subsequent embodiment, or combinations thereof, wherein the at least one of the one or more fluid conduits is a thermoplastic conduit, and the polymeric material is a thermoplastic.

Embodiment 59: The assembly of any preceding or subsequent embodiment, or combinations thereof, wherein the at least one of the one or more fluid conduits is a thermoset conduit, and the polymeric material is a thermoset.

Embodiment 60: The assembly of any preceding or subsequent embodiment, or combinations thereof, wherein the at least one of the one or more fluid conduits is a thermoset conduit, and the polymeric material is a thermoplastic.

Embodiment 61: The assembly of any preceding or subsequent embodiment, or combinations thereof, further comprising providing an adhesive between the collar and the fluid conduit.

Embodiment 62: The assembly of any preceding or subsequent embodiment, or combinations thereof, wherein the fluid conduit is a thermoset material.

Embodiment 63: The assembly of any preceding or subsequent embodiment, or combinations thereof, wherein the fluid conduit is a thermoplastic material.

Embodiment 64: The assembly of any preceding or subsequent embodiment, or combinations thereof, comprising a primer on an exterior of the collar.

These and other features, aspects, and advantages of the present disclosure will be apparent from a reading of the following detailed description together with the accompanying drawings, which are briefly described below. The present disclosure includes any combination of two, three, four, or more features or elements set forth in this disclosure or recited in any one or more of the claims, regardless of whether such features or elements are expressly combined or otherwise recited in a specific embodiment description or claim herein. This disclosure is intended to be read holistically such that any separable features or elements of the disclosure, in any of its aspects and embodiments, should be viewed as intended, to be combinable, unless the context of the disclosure clearly dictates otherwise.

BRIEF DESCRIPTION OF THE DRAWINGS

FIG. 7 is a cross-section of a fluid transfer assembly with multiple fluid transfer conduits.

FIG. 8 is a cross-section of a fluid transfer assembly with multiple fluid transfer conduits.

FIG. 9 is a cross-section of a body of the fluid transfer assembly of FIG. 8.

DETAILED DESCRIPTION OF PREFERRED EMBODIMENTS

Certain exemplary embodiments of the present invention are described below and illustrated in the accompanying figures. The embodiments described are only for purposes of illustrating the present invention and should not be interpreted as limiting the scope of the invention, which, of course, is limited only by the claims below. Other embodiments of the invention, and certain modifications and improvements of the described embodiments, will occur to those skilled in the art, and all such alternate embodiments, modifications, and improvements are within the scope of the present invention.

In some aspects, a fluid transfer assembly, a fluid transfer system, and/or a related method are used for distribution of fluid between large and small vessels. For example, such a fluid transfer assembly and/or system may be useful for sampling a small volume off of a line or body when transferring from one vessel to another vessel, whether or not those vessels are of the same size. In another example, such a fluid transfer assembly and/or system may be useful for adding one or more fluids from one vessel into another vessel (e.g., a small size vessel into a larger size vessel). In a further example, such a fluid transfer assembly and/or system may be useful for incorporating into vessel closures (e.g., MYCAP™) for the addition or removal of one, two, three, four, etc., fluids within the same vessel.

Figure 1:
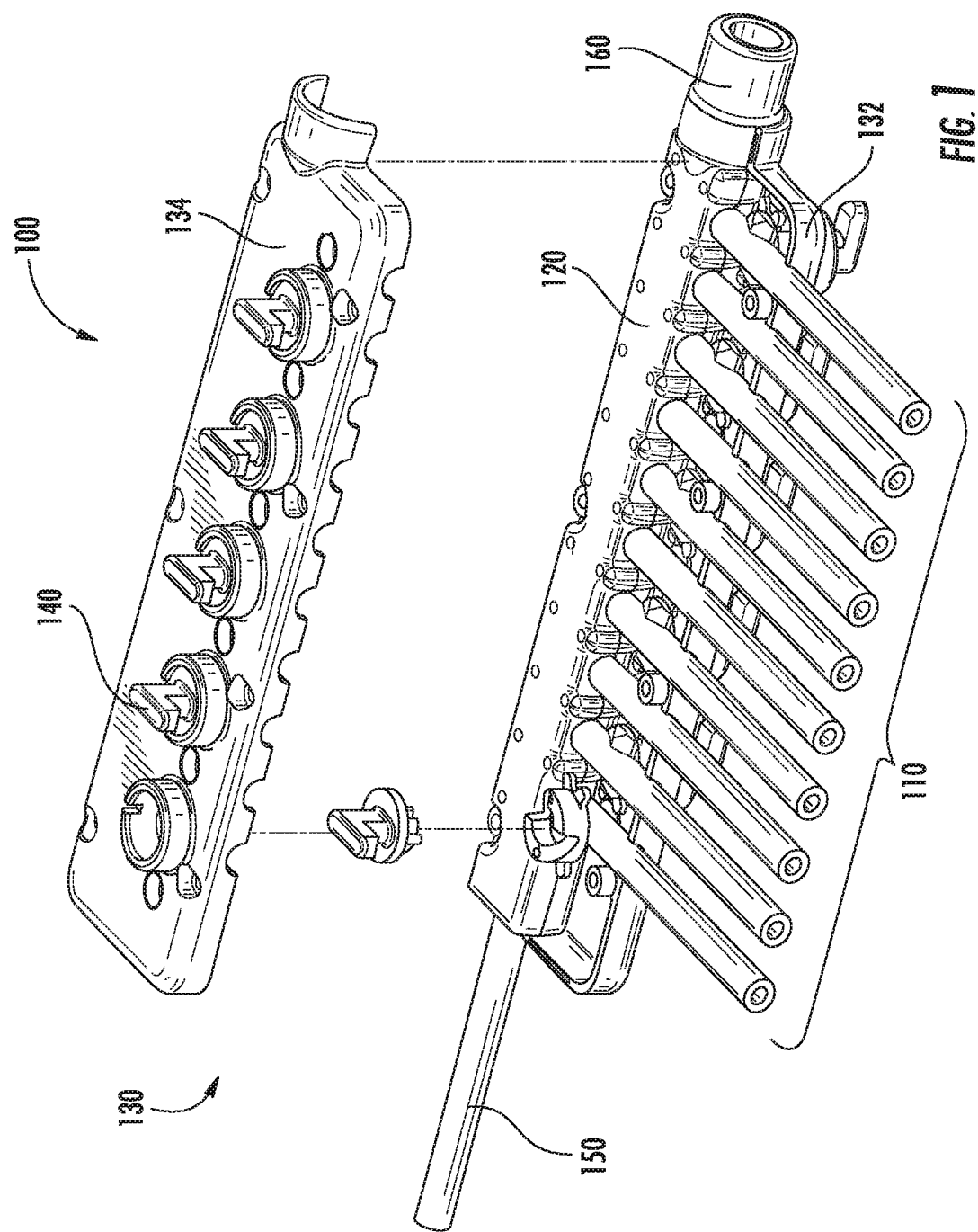
FIG. 1 is an exploded perspective view of a fluid transfer assembly with multiple fluid transfer conduits, a housing, and fluid control devices.

Referring now in more detail to the drawing figures, wherein like reference numerals indicate like parts throughout the several views, FIG. 1 depicts an exploded perspective view of a fluid transfer assembly, generally designated as 100. In particular, a "fluid transfer assembly" 100 as used throughout this disclosure comprises one or more fluid conduits 110 and a lengthened body portion 120 engaged with the conduits 110. In some aspects, for example, the fluid transfer assembly 100 is not limited to the number of fluid conduits shown in FIG. 1, but may incorporate more or fewer conduits as shown throughout the figures. The fluid transfer assembly 100 is thus suitable for use with vessels that include without limitation: containers, beakers, bottles, canisters, flasks, bags, receptacles, tanks, vats, vials, tubes, and the like that are generally used to contain fluids, slurries, cells, drug products, and other similar substances.

It should be understood that the fluid transfer assembly 100 is also not limited to use with any particular fluids but, depending on the size and composition of the assembly 100 and its constituent fluid conduits 110, may be used with fluids with particulates or having a high viscosity or with fluids having no or very little particulate content or low viscosity.

In some aspects, the body portion 120 is longer in a longitudinal dimension (length) rather than a lateral dimension (width) so that the body portion 120 is substantially rectangular shaped. In other aspects, however, the body portion 120 is substantially square, triangular, circular, etc., relative to a length and width dimension. Accordingly, although not shown in FIG. 1, a fluid channel may be defined within the body portion 120. The fluid channel may be in fluid communication with the one or more conduits 110.

The fluid conduits 110 are in some aspects considered as being "long" relative to a length of the body portion 120. For example, the fluid conduits 110 comprise a length of between about 1 inch and about 100 inches or longer depending on the application. The fluid conduits 110 may be selectable depending on whether or not a longer or shorter conduit is desirable for a particular application. Example fluid conduits 110 may have a ⅟₁₆" wall thickness.

In some aspects, a material of the body portion 120 comprises a material having an elongation to break of between about 150% and about 1,500% per ASTM D412C. In some aspects, the material of the body portion 120 is a rubber or other type of elastomer such as a solidified polymeric material. For example, the polymeric material comprises a thermoplastic, a thermoset, a silicone elastomer, a combination thereof, and the like. Other materials having an elongation to break of between about 150% and about 1,500% are also contemplated.

In other aspects, a material of the conduits 110 is a same or similar material to that of the body portion 120. More particularly, the fluid conduits are silicone tubing. The tubing may be of any length suitable and necessary for the desired process. In one embodiment, at least a portion of the silicone tubing is treated with a primer. Suitable primers include, but are in no way limited to, SS-4155 available from MOMENTIVE™, Med-162 available from NuSil Technology, and RODORSIL® V-O6C available from Bluestar Silicones of Lyon, France. Further, in this preferred embodiment, the silicone conduits are combined with a silicone body portion.

In general, if a thermoset is used for the body, silicones, polyurethanes, fluoroelastomers or perfluoropolyethers are preferred construction materials for the conduits. If a thermoplastic is used for the body, C-FLEX® tubing, block copolymers of styrene-ethylene-butylene-styrene, PureWeld, PVC, polysulfone, polyetheretherketone, polyolefins, or polyethylene are preferred construction materials. In some aspects, multiple conduits may be used including combinations of thermoset and thermoplastic materials for the conduits in the same fluid transfer assembly (e.g., a thermoplastic conduit and a thermoset conduit is provided in a fluid transfer assembly). As such, in some examples, the conduits 110 comprise a thermoplastic or a thermoset material and the body portion 120 comprises a silicone elastomer material.

In some aspects, the fluid conduits 110 extending from the fluid transfer assembly 100 may be connected to a variety of vessels for collection. Acceptable vessels include, without limitation, bags, bottles, syringes, centrifuge tubes, or tubing. A plug may also be inserted in the end of the fluid conduits 110. An aseptic connector may also be inserted into the end of the fluid conduit. The fluid conduits 110 may also be connected to additional fluid control devices. The fluid transfer assembly 100 may further comprise a housing 130. In some aspects, the fluid transfer assembly 100 is partially engaged with a housing 130. The housing 130 comprises a bottom portion 132 engaged with the fluid transfer assembly 100, while a top portion of the housing 134 is disengaged therewith. As used herein, the housing 130 is considered "rigid" relative to the fluid transfer assembly 100. The rigidity of the housing refers to material properties of the housing 130, such that the housing, itself, is more inflexible and unable to be bent or stretched relative to the conduits 110 and/or the body portion 120 of the fluid transfer assembly 100. A material of the housing 130, e.g., of the bottom portion 132 and/or the top portion 134, may be selected from the group consisting of polyether sulfone, polyester, polycarbonate, polyamide, polyetherimide, polyether ether ketone, polyolefins, ethylene tetrafluoro ethylene, aluminum, stainless steel, carbon fiber epoxy, and glass filled plastics. Other materials are also contemplated.

In FIG. 1, the bottom portion 132 of the housing is able to engage or secure at least a portion of the fluid transfer assembly 100 therein such that a substantial portion of the body portion 120 and at least a portion of the conduits 110 are secured within the bottom portion 132. The top portion 134, as shown in FIG. 1 is able to be aligned with the bottom portion 132 to securely enclose a substantial portion of the body portion 120 and at least a portion of the conduits 110 therein. In some aspects, bores provided along the bottom and top portions 132, 134 of the housing are able to receive fasteners such as screws, bolts, and the like to fixedly retain the two portions together. Other more permanent mechanisms for retaining the two in alignment such as a permanent solvent or adhesive or ultrasonic welding are also contemplated.

In some aspects, one or more fluid control devices such as valves 140 are engaged with at least one of the conduits 110 and the body portion 120 and the housing 130. Notably, as is known to those of ordinary skill, valves are considered as more reliable than some other types of flow control devices such as, for example, pinch clamps. In this manner, the fluid control devices provided herein provided ultimate user controllability and security.

As illustrated in FIG. 1, for example, five fluid control devices, in this embodiment, pinch valves 140, are provided, which are secured with the body portion 120 by way of the top portion 134 of the housing. However, less or more valves of different styles, sizes, types, etc., are contemplated. In this way, fluid flow within the fluid transfer assembly is controlled, obstructed, enabled, and the like. In some aspects, the valves 140 comprise handles for ease of use or manipulation for a user. Valve stops provided within the top portion 134 of the housing act to limit rotation of the handle. A more detailed view of an exemplary valve is described in reference to FIG. 21.

In some aspects, the fluid transfer assembly 100 comprises additional elements. For example, the body portion 120 comprises a proximal or first end and an opposing or distal end. The proximal end defines tubing 150 such as, for example, a thermoplastic tubing in fluid communication with the fluid channel defined within the body portion. The thermoplastic tubing 150 is configured to be weldable to other thermoplastic tubing in an aseptic manner.

In other aspects, the distal end defines a tube stub 160 to engage a barb to another fluid transfer assembly, or a single-use component (e.g., a filter) to form a closed system. In such aspects, the clamp interface 160 is a threaded connection, a clamp connection, a welded connection, a bonded connection, or any other mechanical connection. Alternatively, the clamp interface 160 is formed as a singular unit with the vessel, other fluid transfer assembly, the single-user component, etc. For example, a bioreactor bag may be formed in a manner whereby the fluid transfer assembly (e.g., the body portion) is formed as an integral component of the bag when the bag is manufactured. Regardless of whether the fluid transfer assembly is a separate component, or formed as an integral part of the vessel, the fluid transfer assembly 100 is combined with the vessel to form a substantially aseptic leak-free connection. As such, the housing 130 is configured to enclose at least a portion of the tubing 150 as well as at least a portion of the clamp interface 160 therein, as well as any other portion of the fluid transfer assembly 100.

Figure 2:
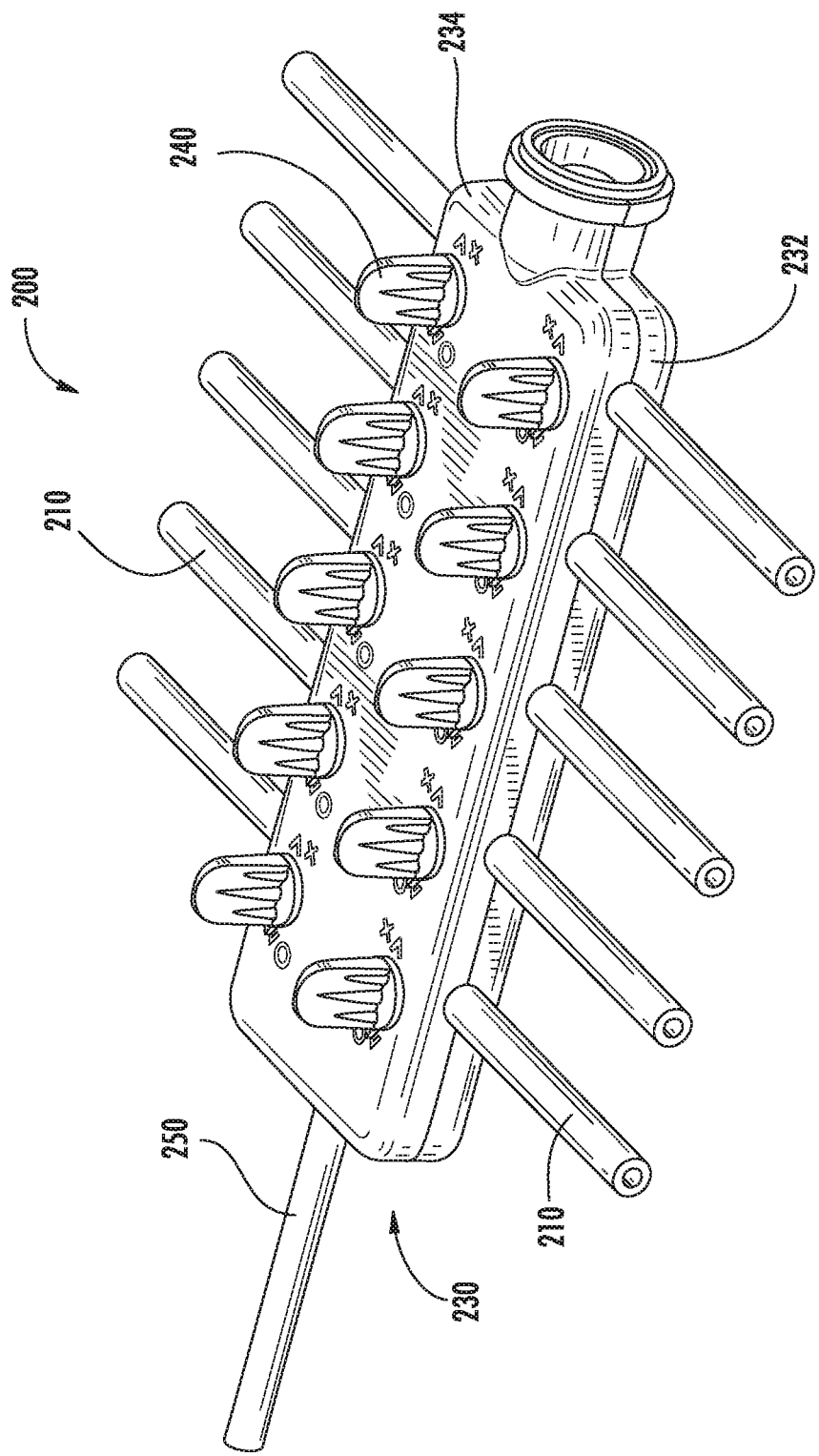
FIG. 2 is a perspective view of a fluid transfer assembly, with multiple fluid transfer conduits, a housing, and fluid control devices.
Figure 3:
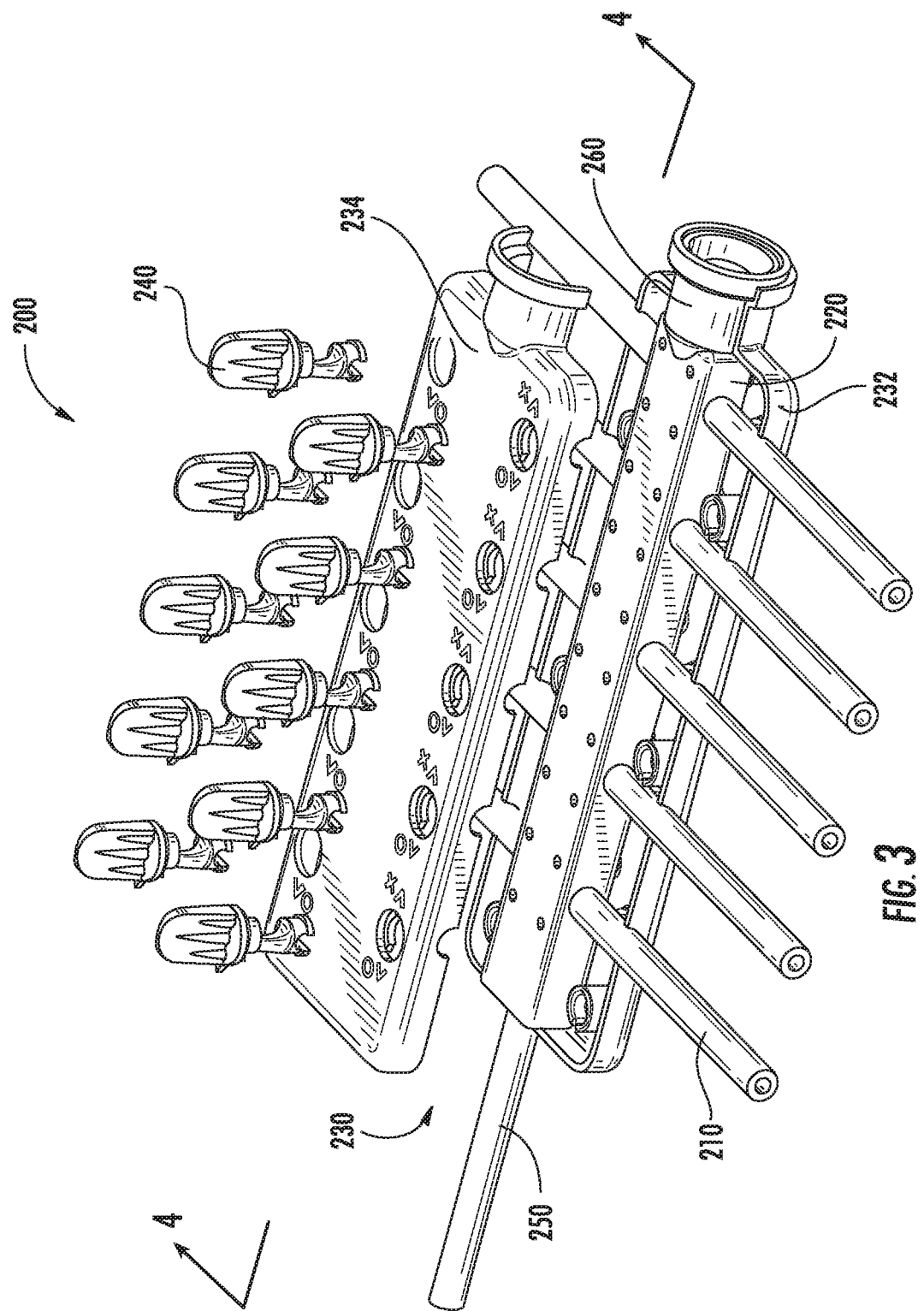
FIG. 3 is an exploded perspective view of a fluid transfer assembly with multiple fluid transfer conduits, a housing, and fluid control devices.

FIGS. 2-5 illustrate a fluid transfer assembly 200, similar to that illustrated in FIG. 1. The fluid transfer assembly 200 comprises ten conduits 210 and a body portion 220. In FIG. 2, a housing 230 having a bottom portion 232 and a top portion 234 are engaged to receive at least a portion of the fluid transfer assembly 200 (i.e., at least a portion of the body portion 220 and at least a portion of the conduits 210) therein. Ten valves 240 each engaged with an individual conduit 210 and the top portion 234 of the housing are provided in FIGS. 2-5. Thus, the valves 240 are configured to control the fluid flow within the fluid transfer assembly 200.

Figure 4:
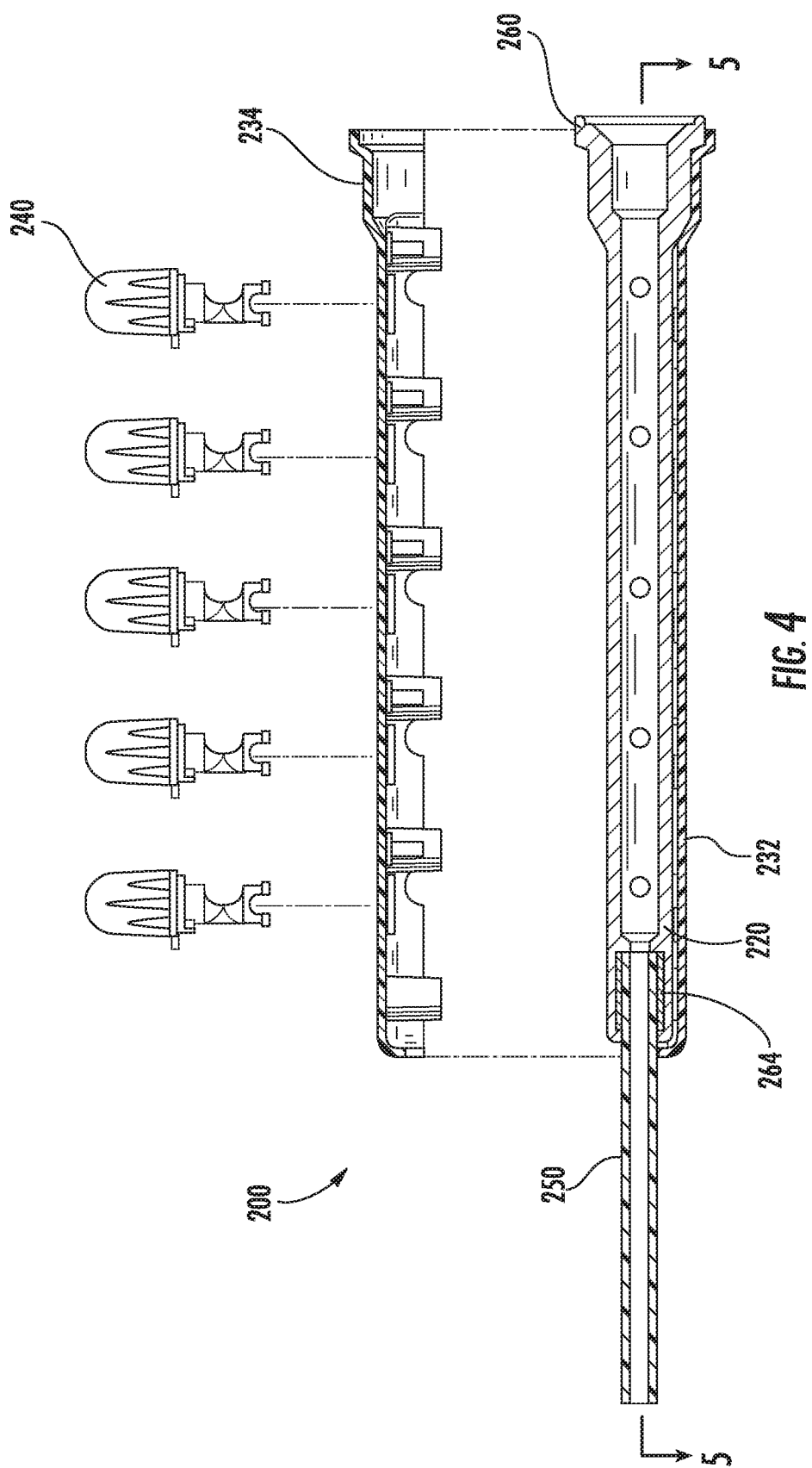
FIG. 4 is a cross-section of a fluid transfer assembly with multiple fluid conduits, a housing, and fluid control devices.
Figure 5:
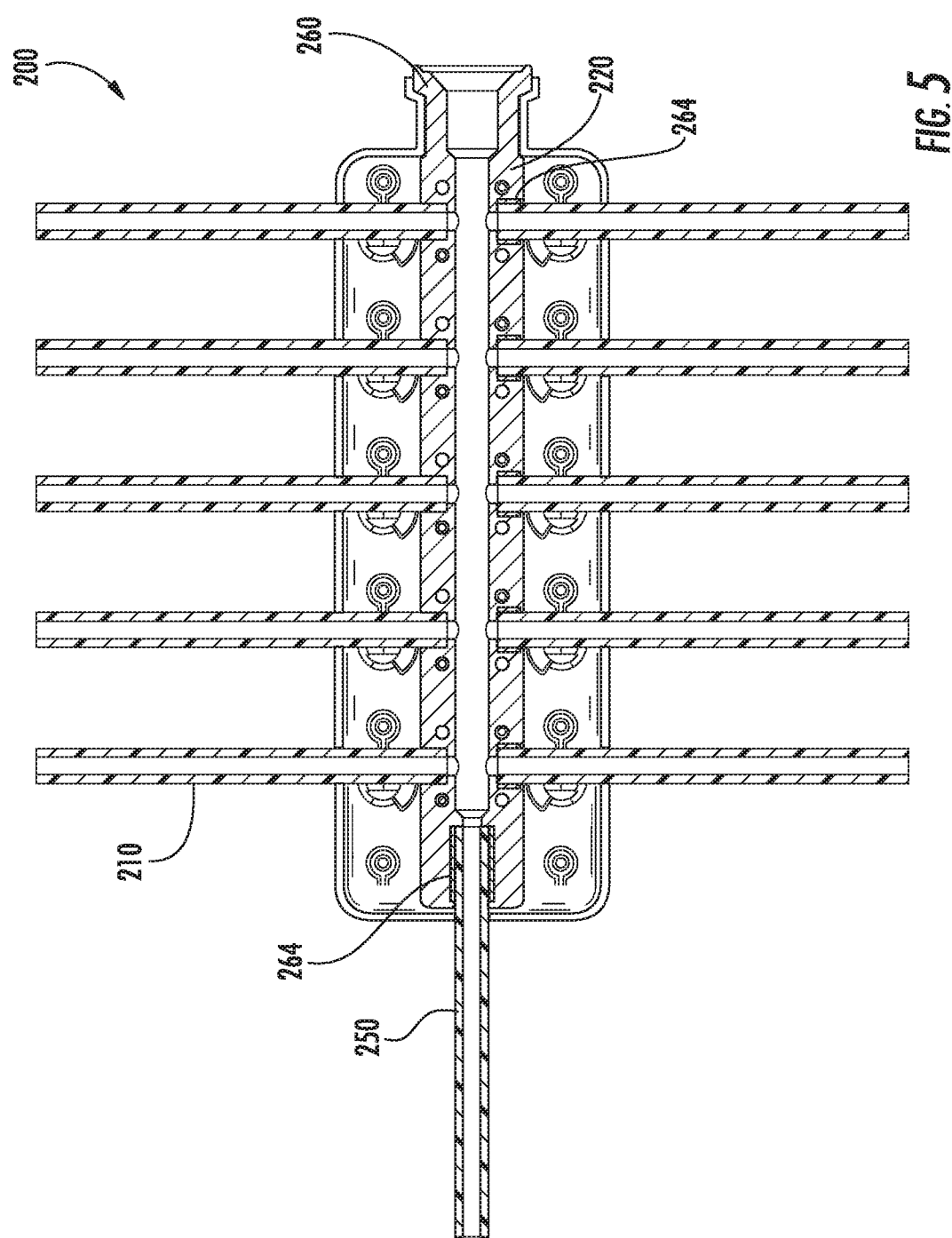
FIG. 5 is a cross-section of a fluid transfer assembly with multiple fluid transfer conduits, a housing, and fluid control devices.

Similar to FIG. 1, the body portion 220 illustrated in FIGS. 2-5 comprises a proximal end defining tubing 250 such as, for example, a thermoplastic tubing in fluid communication with the fluid channel defined within the body portion 220. In other aspects, an opposing distal end defines a clamp interface 260 that functions similar to the tube stub 160 in FIG. 1. In some aspects, the proximal end defining tubing 250 may be surrounded by a collar 264 as shown in FIG. 4. The collar 264 may be a cylindrical tube with a wall thickness of about 0.032". The collar 264 may be useful for retaining a distal end of the tubing 250 in connection with the body portion 220. In one aspect, the body portion 220 is configured to cover at least a portion of the collar 264. In another aspect, the body portion 220 may be configured to substantially cover an exterior end of the collar 264. In another aspect, the body portion 220 may be configured to substantially fully cover the collar 264 such that the collar is substantially fully embedded within the body portion. In these aspects, the collar 264 may be metallic or polymeric and attached to the tubing 250 with an adhesive. The adhesive may be applied with a thickness on the order of about 0.005". The use of a collar 264 to help prevent separation from the body portion 220 may also be applied to one or more of the fluid conduits 210.

In some aspects, the collar 264 may be beneficial to facilitate tying together dissimilar materials. When used to assist the coupling of dissimilar materials, the collar 264 may preferably comprise a metal material. For example, where the body portion 220 is formed from a silicone elastomer or similar thermoset material, and one of the tubing 250 or one of the fluid conduits 210 is made from a thermoplastic material, the collar 264 may strengthen the joint therebetween. Particularly, the collar 264 can be positioned around the end of the tubing 250 (or fluid conduit 210) that is overmolded with the body portion 220. In one aspect, an adhesive may be used to join the collar 264 to the fluid conduit 210 or tubing 250. In one aspect, a primer may be applied to an exterior of the collar 264 to promote bonding with the body portion 220 that is formed from silicone elastomer or other thermoset material with sufficient elongation to break. One skilled in the art will appreciate that a silicone elastomer may be considered a specific example of a thermoset material.

In yet another embodiment, the collar 264 may be a thermoplastic material and can be attached to the distal end of the tubing 250 or fluid conduits 210 using an adhesive, such as a hot melt adhesive. In a further embodiment, the body portion 220 may be formed from a thermoplastic elastomer having an elongation to break of between about 150% and about 1500%.

To conclude, collars 264 may be used on one or more of the tubing 150, 250, etc. and fluid conduits 110, 210, etc. In various embodiments the collars 264 may be metallic, thermoplastic, thermoset, silicone, or other material. The collars 264 may be used between similar materials such as a thermoplastic body portion and thermoplastic fluid conduits, or a thermoset body portion and a thermoset fluid conduit, or a silicone elastomer body portion and a silicone elastomer fluid conduit. Collars 264 may be particularly beneficial when used between dissimilar materials, such as a silicone elastomer (or thermoset) body portion and thermoplastic fluid conduits, or a thermoplastic body portion and thermoset or silicone elastomer fluid conduit.

Figure 6:
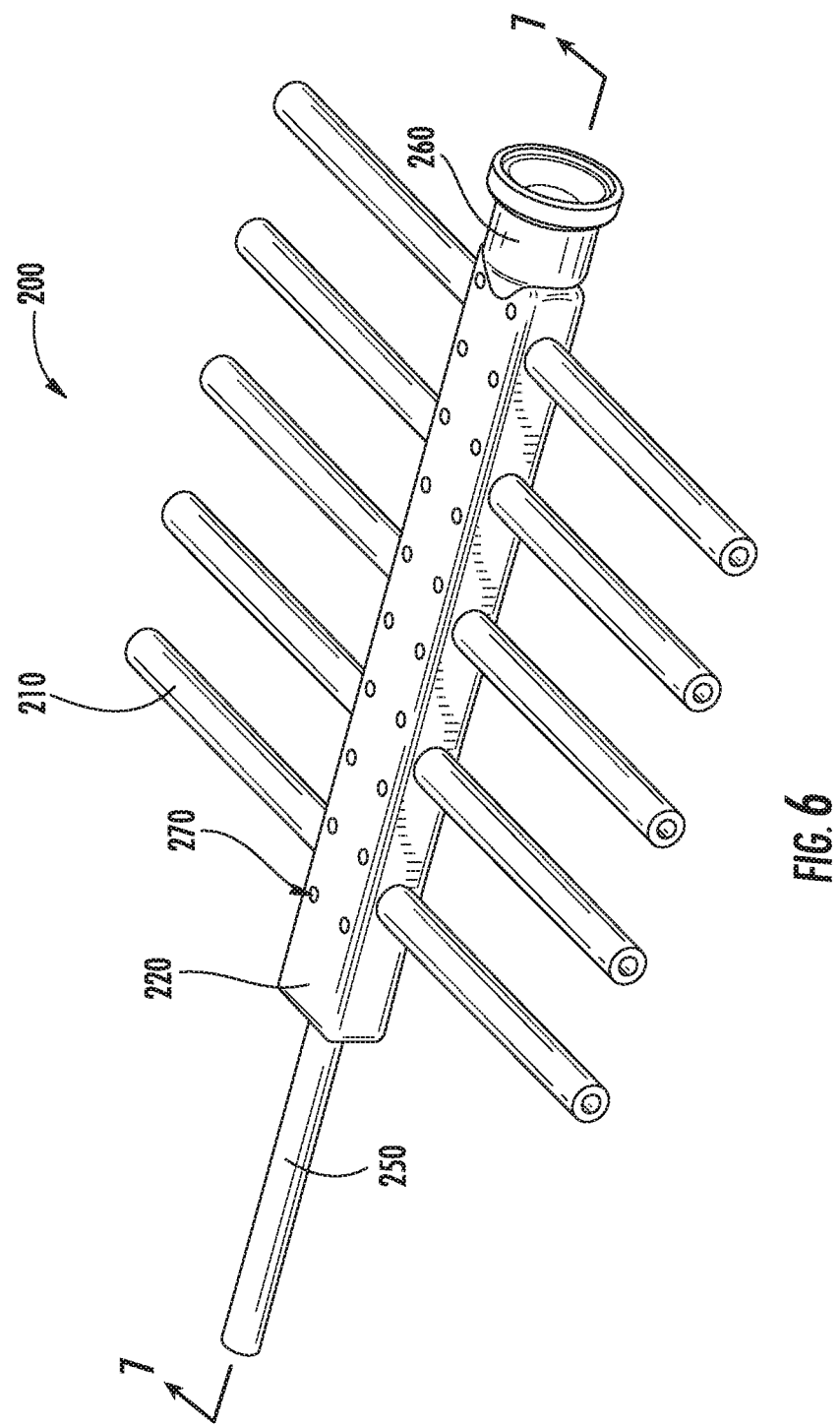
FIG. 6 is a perspective view of a fluid transfer assembly with multiple fluid transfer conduits.
Figure 12:
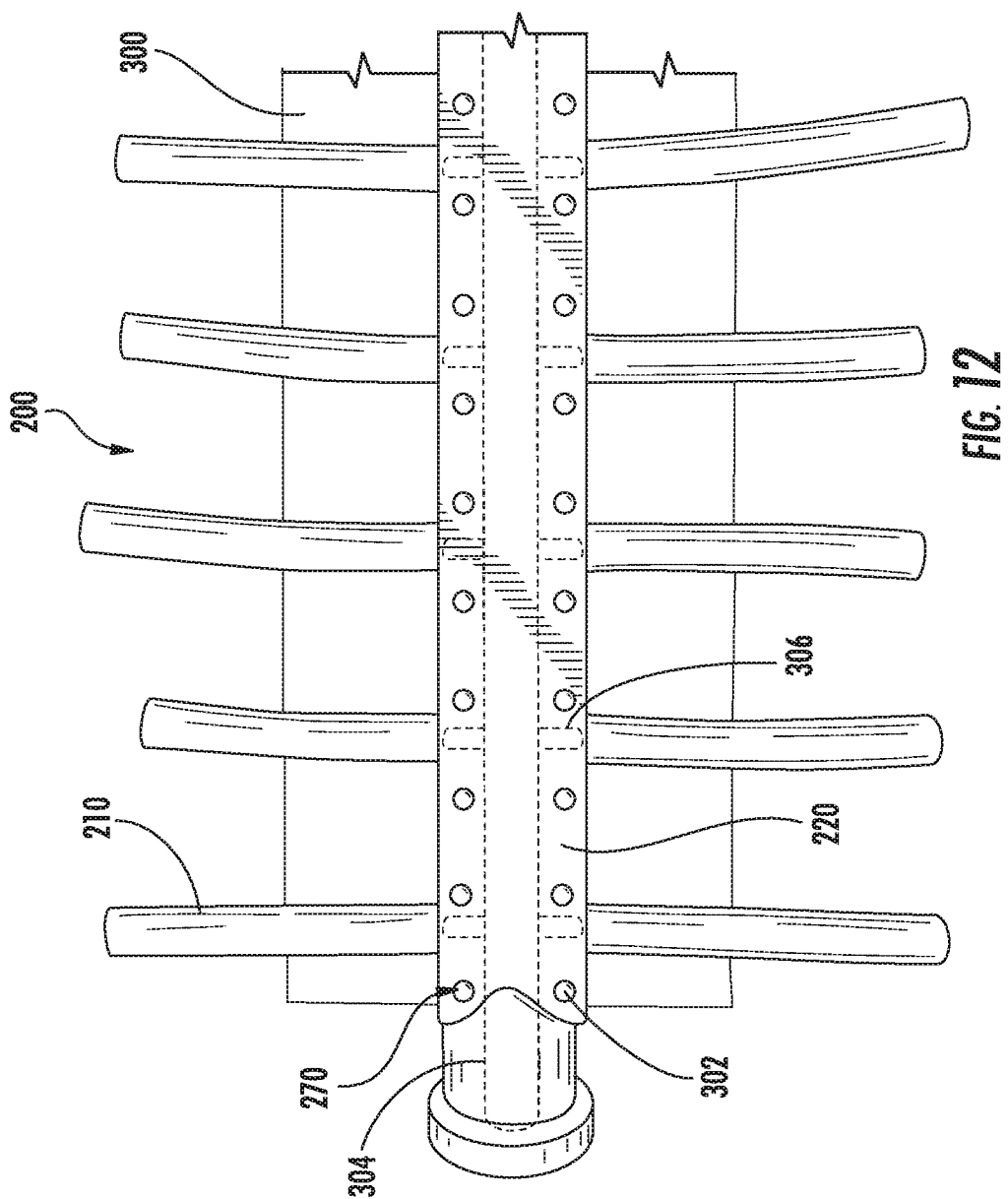
FIG. 12 is a top view of a fluid transfer assembly with multiple fluid transfer conduits on a stretching fixture in an unelongated state.
Figure 13:
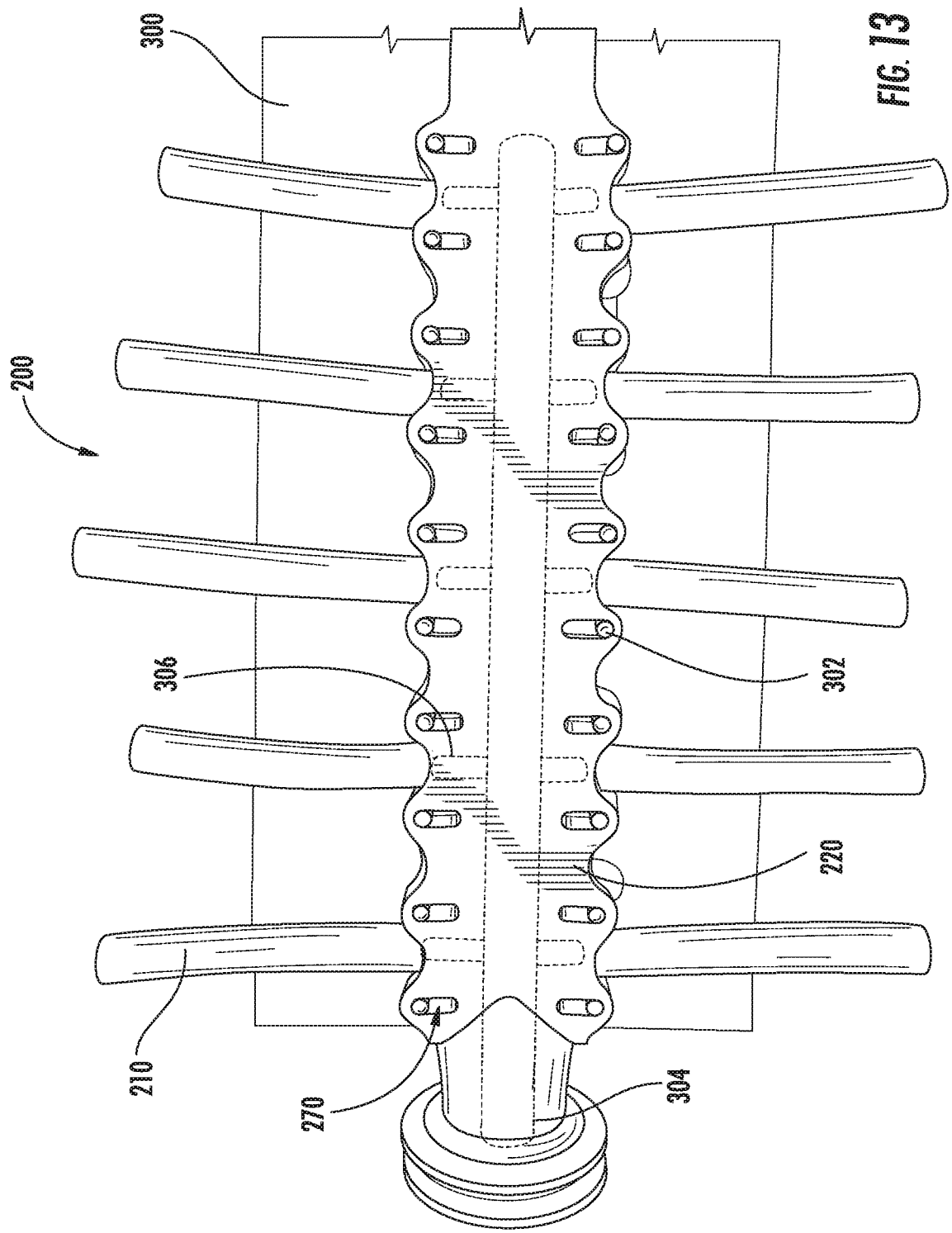
FIG. 13 is a top view of a fluid transfer assembly with multiple fluid transfer conduits on a stretching fixture in an elongated.

Referring now to FIGS. 6-8, a view of the fluid transfer assembly 200 is illustrated in greater detail. In some aspects, the body portion 220 defines one or more internal recesses 270 that enable the body portion 220 to be stretched from the unelongated state to an elongated state. Stresses are applied to the body portion 220 other than typical stresses to stretch the body portion 220 to the elongated state. For example, and as illustrated in FIGS. 12 and 13, a stretching fixture 300 (e.g., a vice) comprising a plurality of pins 302 that align with each of the internal recesses 270 of the body portion 220 is usable to engage the internal recesses 270 of the body portion 220 and thus stretch the body portion 220 in a direction relative to the longitudinal axis of the body portion 220. FIG. 12 illustrates the fluid transfer assembly 200 in an unelongated state having the internal recesses 270 aligned with the pins 302, while FIG. 13 illustrates the fluid transfer assembly 200 in an elongated or "stretched" state. In this manner, a mandrel 304 and one or more protrusions 306 extending outwardly from the mandrel may be removed from the fluid transfer assembly, which will be described in further detail below.

Notably, with regard to the stretching fixture 300, this is only one exemplary embodiment of a stretching fixture, apparatus, or mechanism that is able to engage the internal recesses 270 of the body portion 220 of a fluid transfer assembly 200 or other similar assembly. Other such embodiments of a stretching fixture are also contemplated, including, for example, a hook used for radial expansion to remove the mandrel (see, e.g., FIG. 19).

Referring now to FIG. 9, a cross-section of the fluid channel defined within the body portion 220 of the fluid transfer assembly 200 is illustrated. As described below, a fluid channel of a fluid transfer assembly is formed in the following manner.

A method of forming a fluid transfer assembly is provided herein. The method of forming the fluid transfer assembly or system provided herein provides numerous benefits or advantages such as simplifying manufacturing costs and time by utilizing fluid conduits formed from tubing rather than from molding "Y joints" to a manifold. The method of forming the fluid transfer assembly or system provided herein provides further benefits or advantages by reducing a number of connections needed to be made between vessels from which fluid is transferred. For example, the fluid conduits of the fluid transfer assembly and the fluid channel defined within the body portion thereof provide a simple flow path for fluid flow from a first vessel to a second vessel. Additional vessels may be easily connected to additional fluid conduits (not in use) of the fluid transfer assembly for fluid flow from the first vessel to the second vessel and the additional vessels. The method provided herein is also advantageous in that there is added security in that the fluid transfer assembly more securely engages with vessels as compared to barb fittings that leak under pressure or luers that may come undone during use.

In an initial step, one or more protrusions 306 extending outwardly from a mandrel 304 may be engaged with one or more fluid conduits 210 such as shown in FIG. 12. As used herein, a mandrel may comprise one known to those of ordinary skill in the art. The one or more protrusions may radially extend off the mandrel at varying intervals depending on a number of conduits desired. For example, if there are five pairs of conduits to be used in the fluid transfer assembly, the mandrel may comprise five pairs of equally spaced apart protrusions about a length of the mandrel. In some aspects, a size and/or shape of the mandrel and/or the protrusions depends on the fluid transfer assembly's application. For example, where it is desirable to have a fluid transfer assembly having a body portion of a specific length and conduits of a specific diameter, a length and/or diameter of the mandrel and a diameter of the protrusions may be sized accordingly. In some aspects, a cross-sectional area of the flow channel defined by the body portion is dependent upon a diameter of the mandrel. In a preferred aspect, the one or more protrusions comprise a length less than or equal to a diameter of the mandrel.

Figure 14:
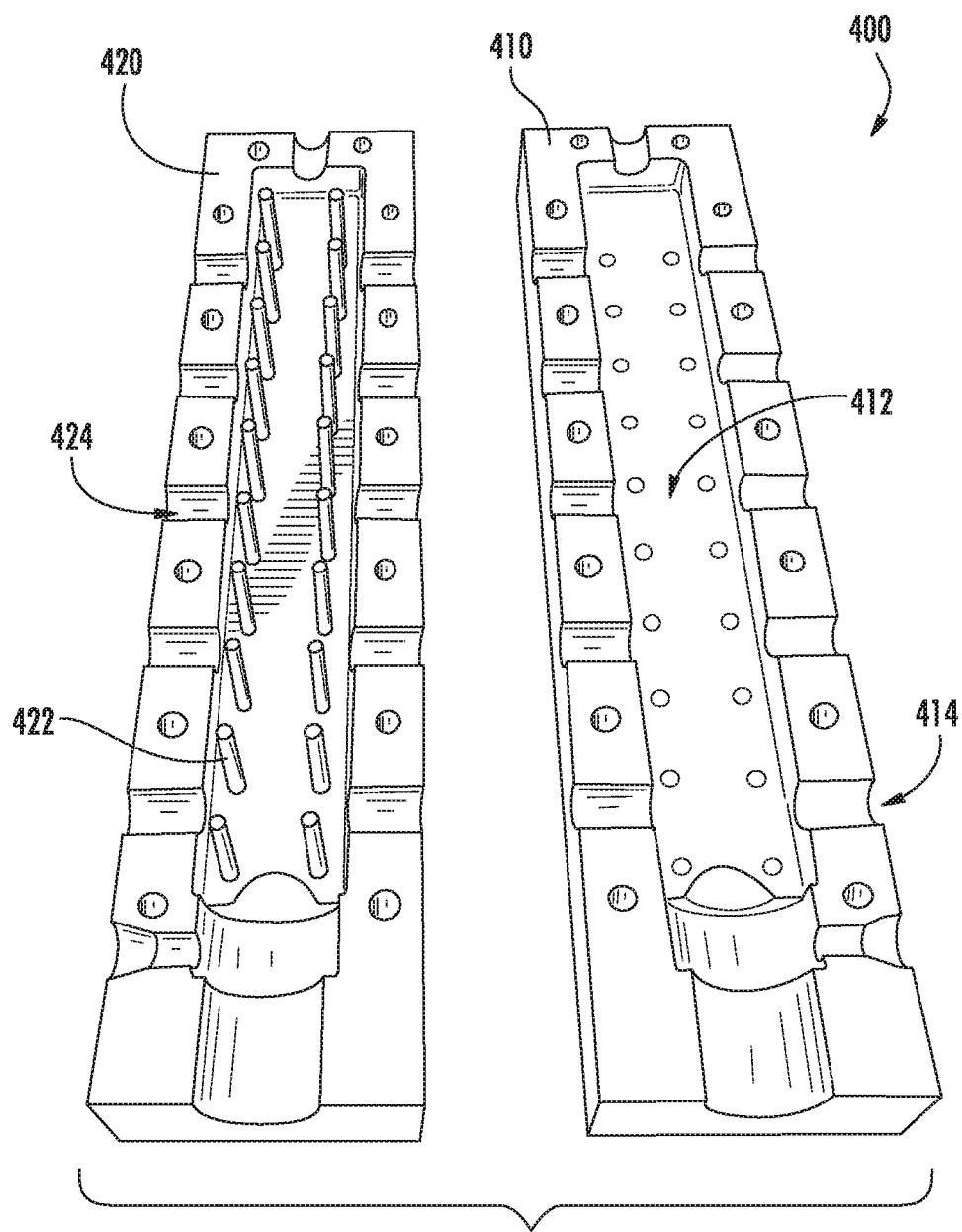
FIG. 14 is a perspective view of a mold.
Figure 15:
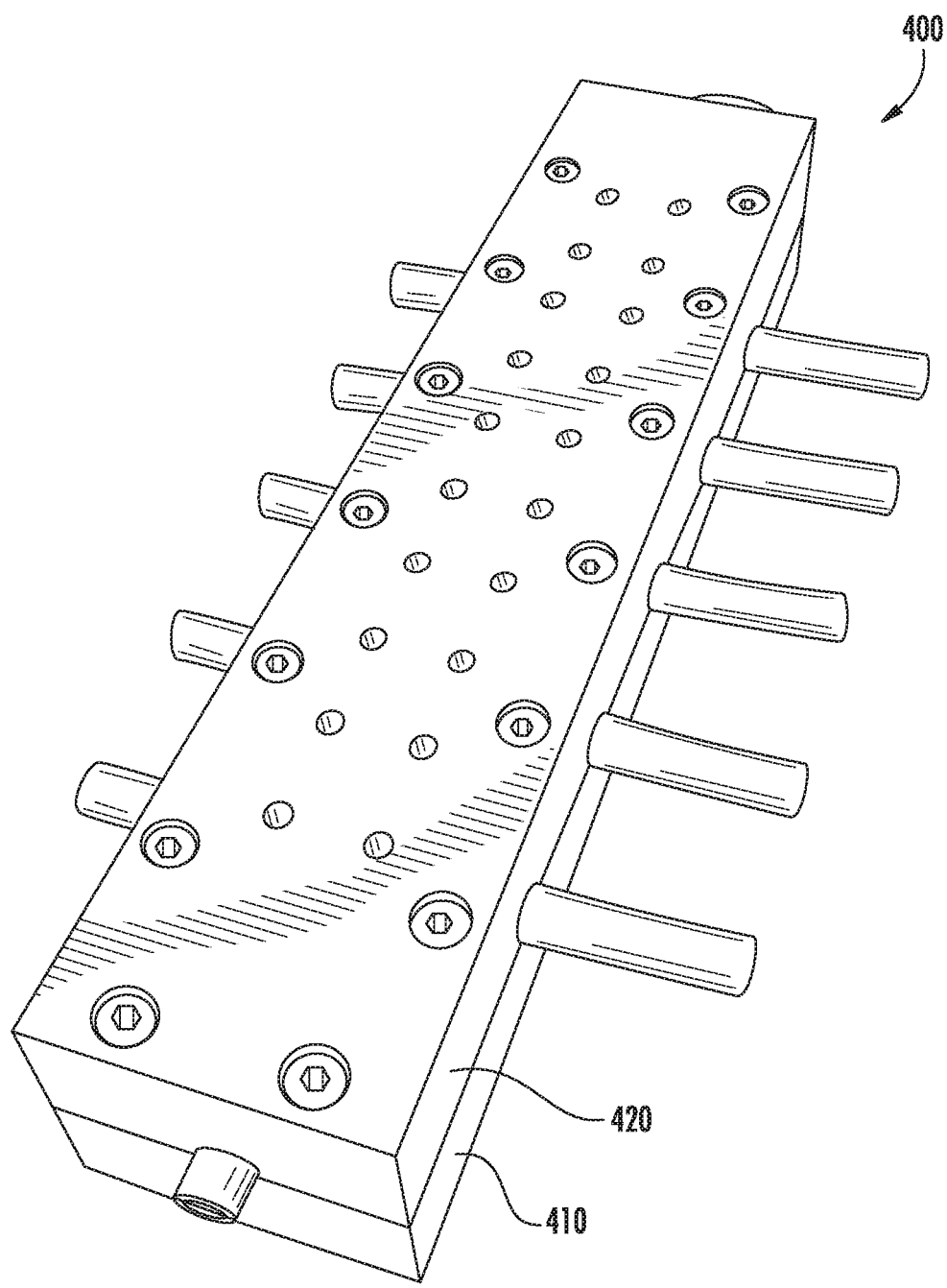
FIG. 15 is a perspective view of a fluid transfer assembly with multiple fluid transfer conduits within a mold.
Figure 16:
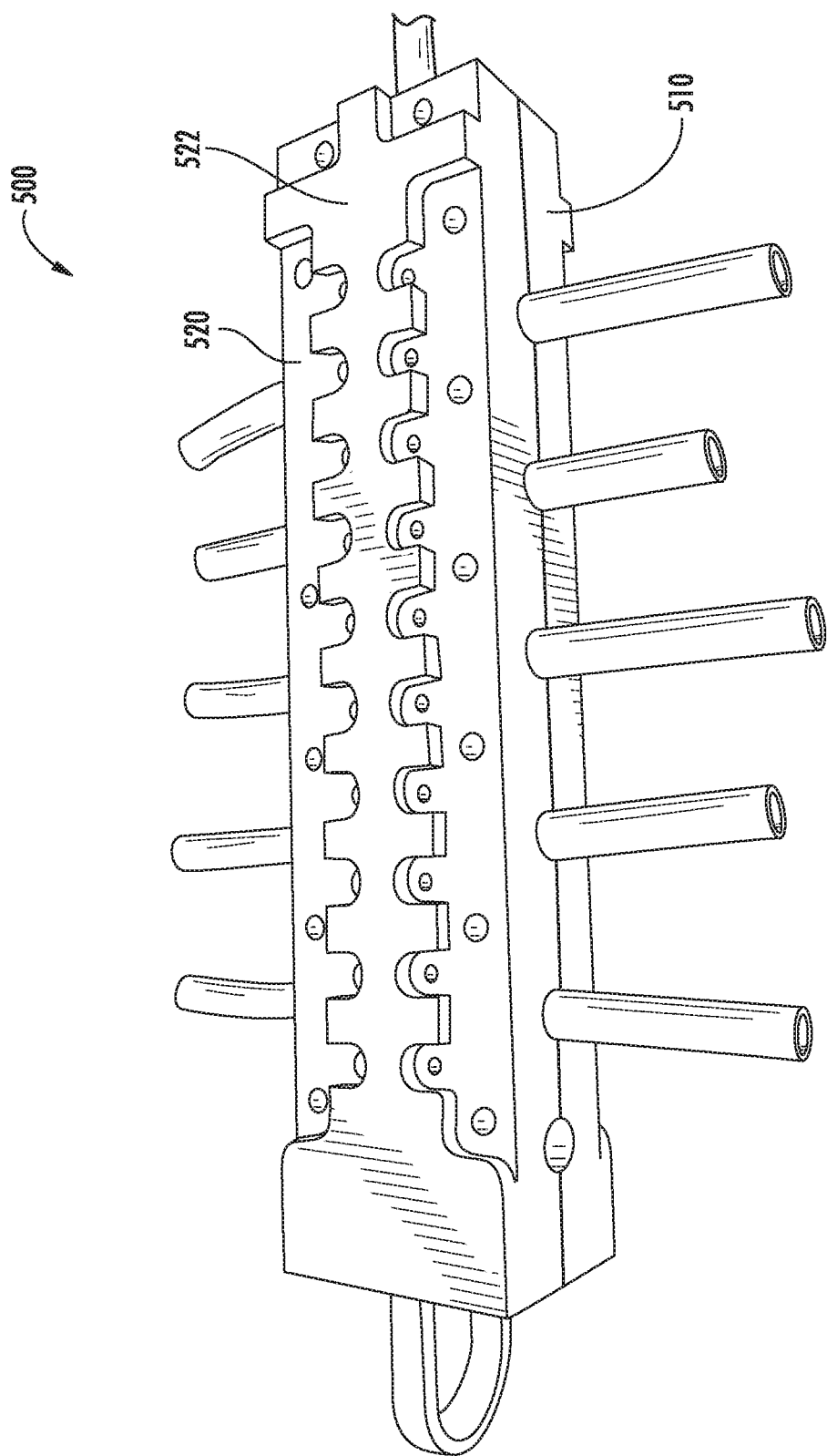
FIG. 16 is a perspective view of a fluid transfer assembly with multiple fluid transfer conduits within a mold having a raised surface.

In another step, the mandrel with the one or more protrusions engaging the conduits may be positioned into a mold. FIGS. 14 and 15 illustrate an exemplary mold 400. The mold 400 comprises a two part mold having a bottom portion 410 and a top portion 420. In some aspects, the bottom portion 410 defines a cavity 412 for receiving the mandrel with the one or more protrusions engaged with the conduits therein. Relief sections 414 defined along a periphery of the longitudinal edges of the bottom portion 410 are provided for receiving the fluid conduits therein. In some aspects, the top portion 420 comprises one or more posts 422 to form the internal recesses within the body portion. The posts 422 are, in some aspects, a metallic or other rigid material. Like the bottom portion 410, the top portion 420 may comprise relief sections 424 defined along a periphery of the longitudinal edges for receiving the fluid conduits therein. Sleeves may be inserted over the posts before molding occurs such that the sleeves are incorporated into and made integral with the recess within the body portion after molding. In this manner, the sleeves are configured to strengthen and prevent damage to the body portion of the fluid transfer assembly during elongation, as described herein. As such, the sleeves may be a material selected from the group consisting of polyether sulfone, polyester, polycarbonate, polyamide, polyetherimide, polyether ether ketone, polyolefins, ethylene tetrafluoro ethylene, aluminum, stainless steel, carbon fiber epoxy, and glass filled plastics or any other similar material. After the mandrel is positioned in the bottom portion 410, the top portion 420 of the mold is then able to be aligned with the bottom portion 410 and secured via any type of securing mechanism (e.g., clamps, fasteners, etc.) As such, in a closed and secured position, the mold 400 may resemble the mold in FIG. 15, where fasteners 430 extend through the top portion 420 and into the bottom portion 410 of the mold 400. Alternatively, as illustrated in FIG. 16, a mold 500 having a bottom portion 510 and a top portion 520 comprises a raised surface 522 on at least a top portion 520, which is configured to allow fasteners to not extend past a surface thereof when the mold 500 is in a closed and secured position. In some aspects, the raised surface 522 is machined.

In another step, a polymeric material may then be introduced into the mold 400 to substantially surround the mandrel and at least a portion of the conduits engaged with the one or more protrusions. The polymeric material introduced therein may comprise a polymeric material as described herein. Depending on a size of the cavity 412, a predetermined quantity of polymeric material may be introduced into the mold 400.

In another step, the polymeric material in the mold may be solidified to define a fluid transfer assembly (e.g., fluid transfer assembly 100, 200) comprising a body portion engaged with the one or more conduits. For example, solidification of the polymeric material comprises curing the polymeric material having an elongation to break of between about 150% and about 1,500%. "Curing" refers to toughening or hardening the material by cross-linking the polymer chains by heat, chemical additives, ultraviolet radiation, electron beams, pressure, and the like. A high or lower powered laser, an oven, or other curing mechanism may be utilized to cure the polymeric material until cross-linking of the polymer chains occurs. Otherwise, solidification refers to the heating and subsequently cooling of the polymeric material as a thermoplastic about the mandrel to thereby join the one or more conduits together within the mold. Regardless, the molding step results in joining one or more conduits together using the polymeric material and the mandrel. In another step, the fluid transfer assembly may be removed from the mold 400. For example, removing the fluid transfer assembly from the mold comprises opening the mold 400 by unfastening the top and bottom portions 410, 420 and removing the solidified polymeric material therefrom. The mandrel and the one or more protrusions extending outwardly from the mandrel with the one or more conduits engaged therewith will have formed a solidified body portion that is readily removable from the mold in substantially one piece.

In another step, the body portion may be stretched into an elongated state to remove the mandrel with the one or more protrusions. For example, as described hereinabove in reference to FIG. 13, one or more internal recesses defined by the body portion enable the body portion to be stretched from the unelongated state into the elongated state. In another step, the mandrel with the one or more protrusions may be removed from the fluid transfer assembly. More particularly, while the fluid transfer assembly remains in the elongated state on the stretching fixture or vice (e.g., 300) the mandrel and the one or more protrusions may be pulled from the fluid transfer assembly in a longitudinal direction.

Figure 10:
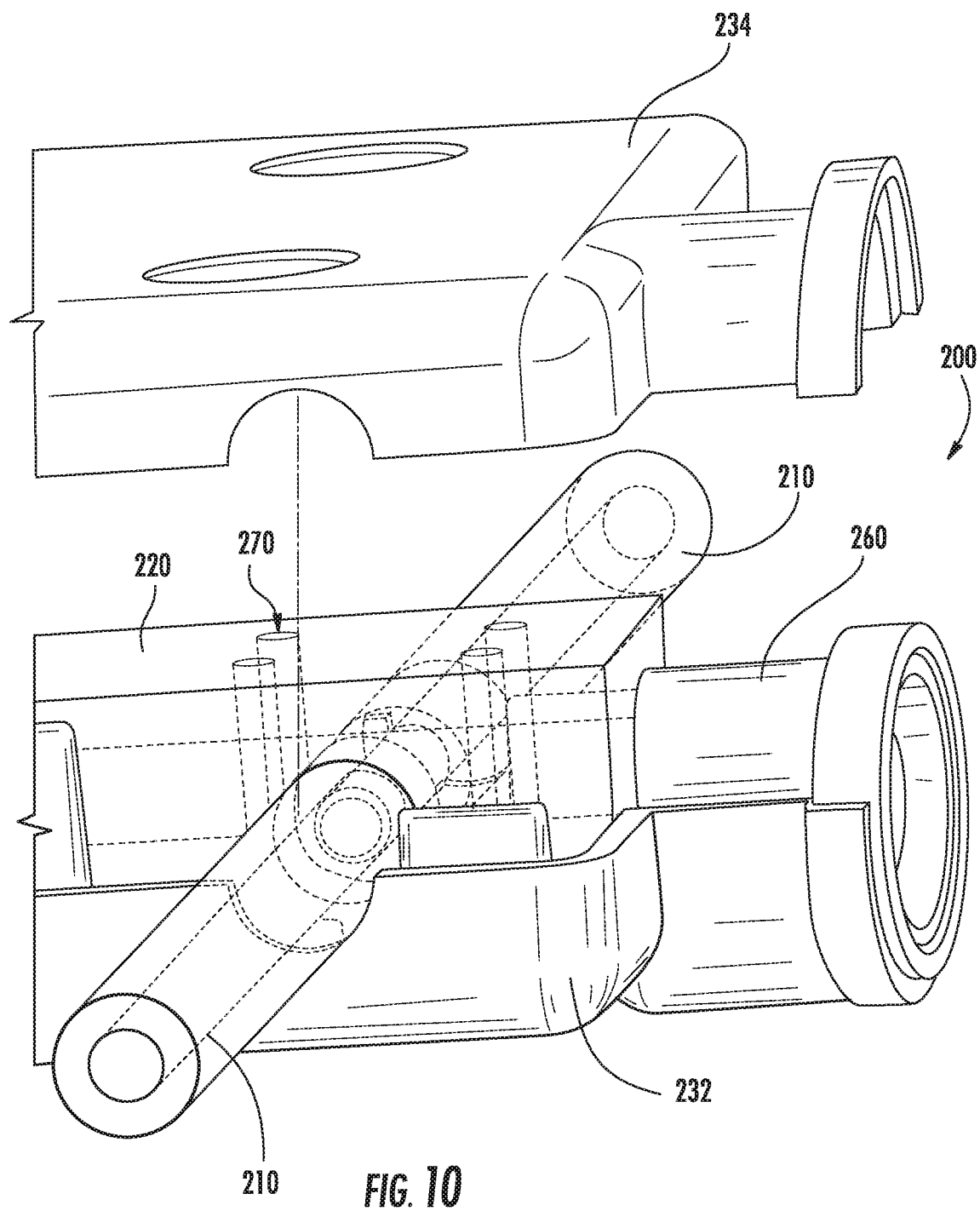
FIG. 10 is an exploded perspective view of a fluid transfer assembly showing two fluid transfer conduits and a housing.
Figure 11:
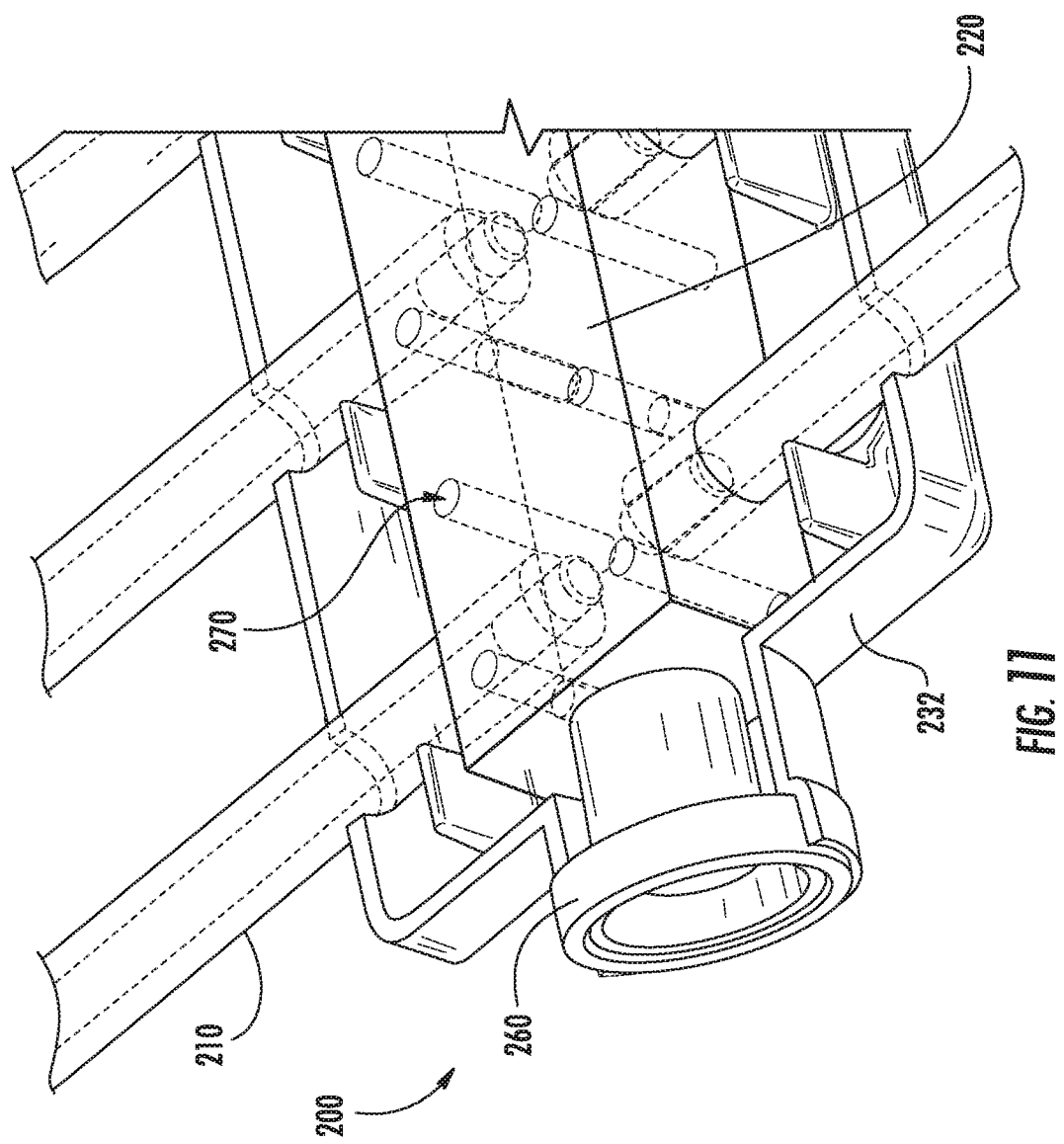
FIG. 11 is a perspective view of a fluid transfer assembly with multiple fluid transfer conduits inside a bottom portion of a housing.

In another step, the fluid transfer assembly may then be relaxed into an unelongated state from the elongated state such that a fluid channel in fluid communication with the one or more conduits is formed within the body portion. More particularly, and as illustrated in FIGS. 10 and 11, removal of the mandrel and the one or more protrusions results in the fluid channel remaining within the body portion 220 of the fluid transfer assembly 200. Thus, fluid flow between the conduits, the fluid channel, the tubing 150, and any vessel engaged with a clamp interface is provided. As such, a fluid transfer assembly having a fluid channel with a diameter larger than a diameter of conventionally produced fluid transfer assembly results due to the removal of the mandrel from an interior of thereof.

In some aspects, a fluid transfer system is provided. For example, the fluid transfer system comprises the elements for manufacturing a fluid transfer assembly such as fluid transfer assembly 100 and/or 200. The elements of the fluid transfer system include, for example, a mandrel with one or more protrusions extending outwardly therefrom, one or more fluid conduits configured to engage the one or more protrusions of the mandrel, a mold configured to receive the mandrel and the one or more protrusions therein, a polymeric material configured to be introduced into the mold and substantially surround the mandrel and at least a portion of the conduits engaged with the one or more protrusions, and a solidifying mechanism configured to solidify the polymeric material in the mold to define a body portion engaged with the conduits having an elongation to break of between about 150% and about 1,500%.

In some aspects, a housing configured to receive at least a portion of the body portion and at least a portion of the conduits, one or more fluid control devices, such as pinch valves, configured to be engaged with at least one of the conduits and the body portion, and the housing to control fluid flow within the fluid transfer assembly, and/or a sleeve positioned in the mold to define the one or more internal recesses in the body portion upon removal of the fluid transfer assembly from the mold are also provided with the system. Other elements are also contemplated.

Figure 17:
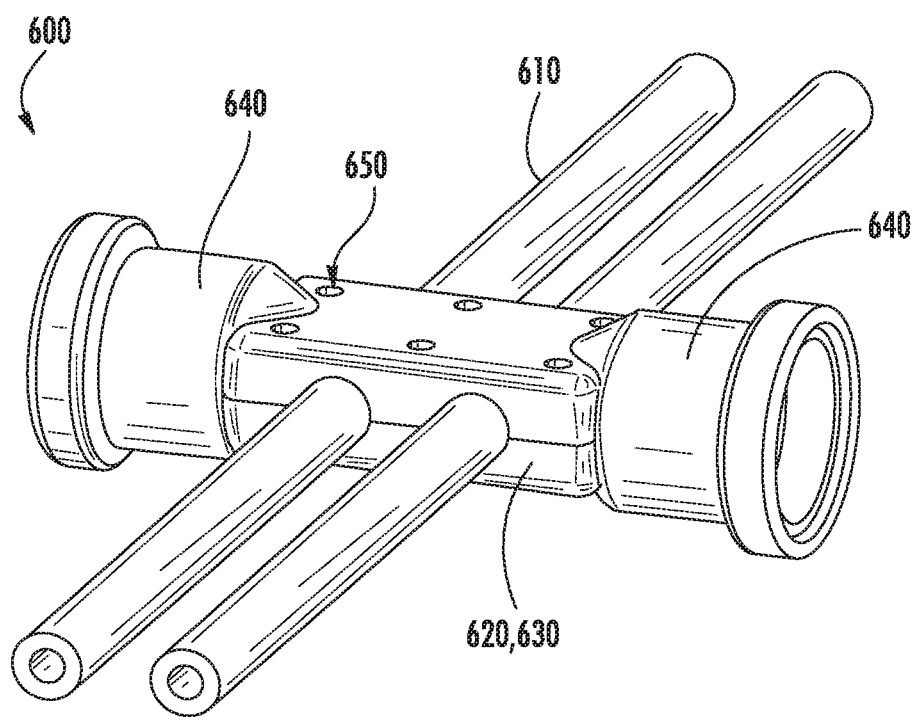
FIG. 17 is a perspective view of a fluid transfer assembly with multiple fluid transfer conduits.
Figure 18:
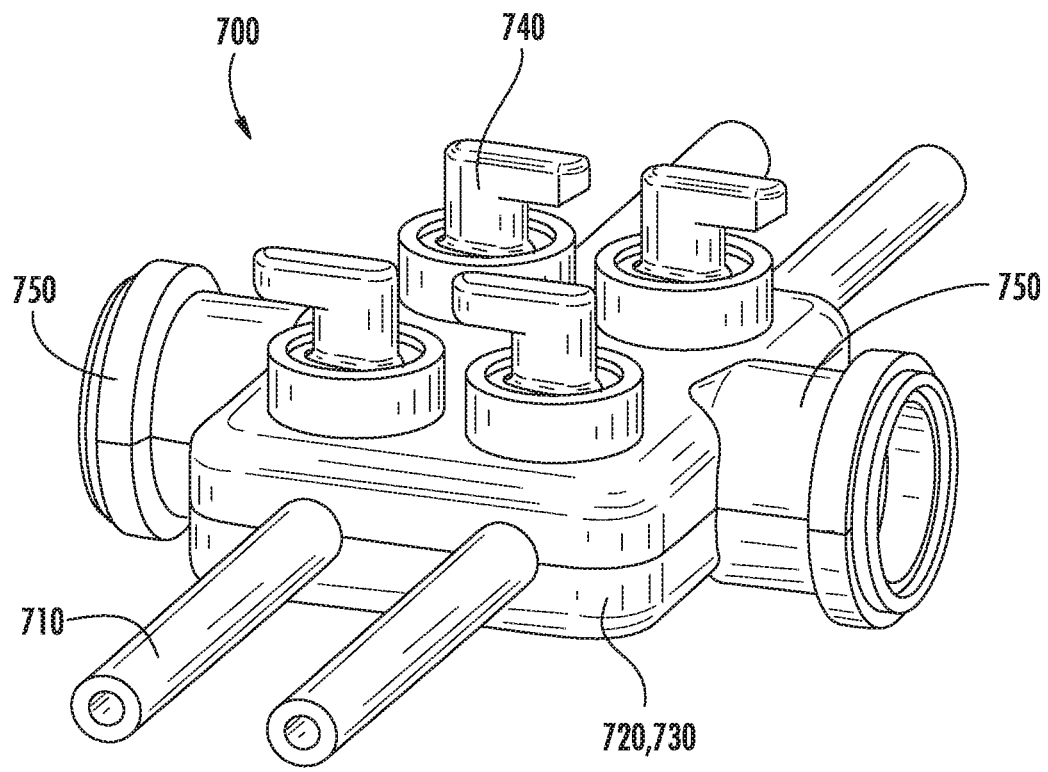
FIG. 18 is a perspective view of a fluid transfer assembly with multiple fluid transfer conduits within a housing and with fluid control devices.

FIG. 17 illustrates an exemplary fluid transfer assembly 600 having four fluid conduits 610, a body portion 620, a housing 630, two opposing clamps 640, and six internal recesses 650. FIG. 18 illustrates an exemplary fluid transfer assembly 700 having four fluid conduits 710, a square-shaped body portion 720, a housing 730, four valves 740, and two opposing clamps 750.

Figure 19:
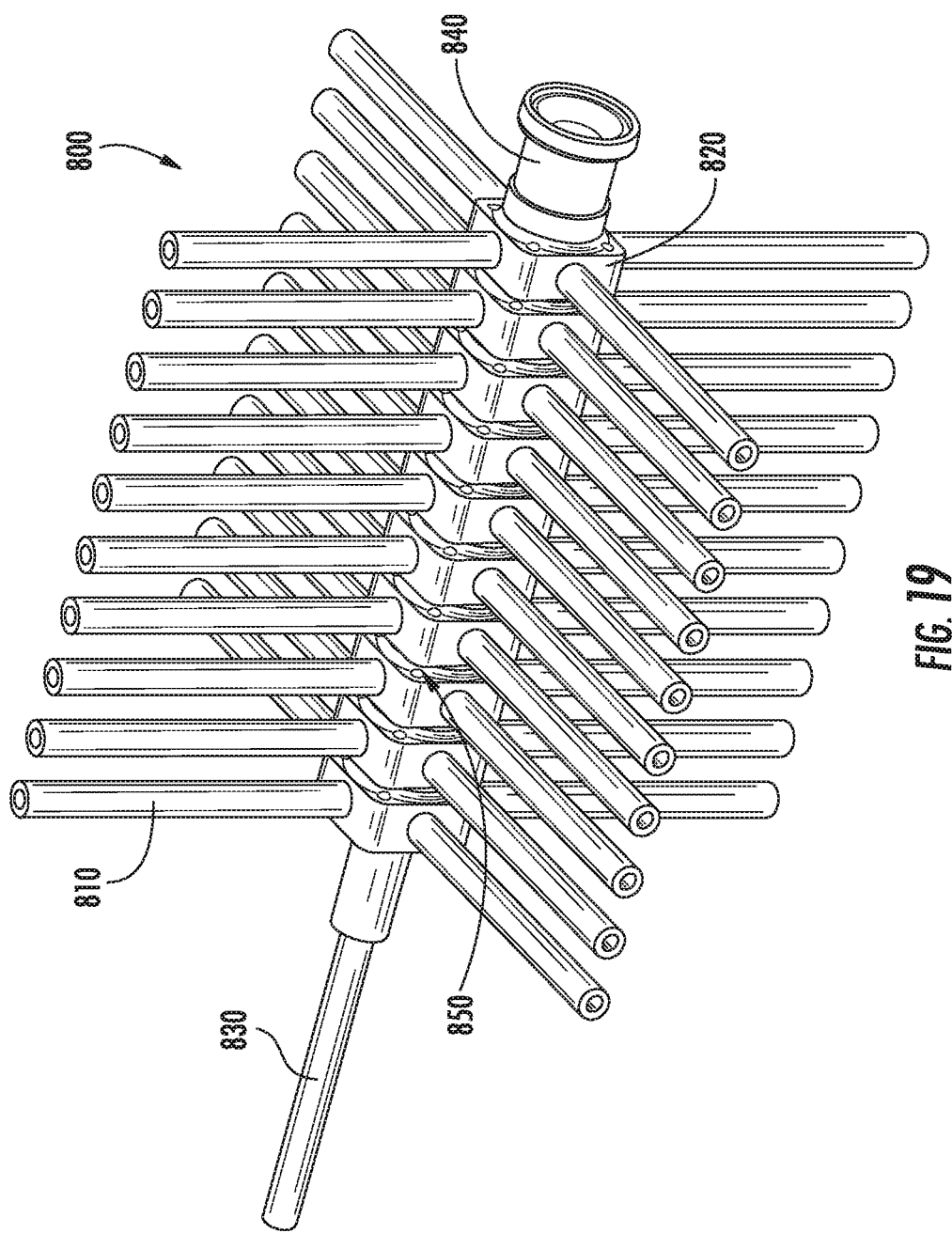
FIG. 19 is a perspective view of a fluid transfer assembly with multiple fluid transfer conduits within a housing, the multiple fluid transfer conduits extending radially from the assembly.

FIG. 19 illustrates an exemplary fluid transfer assembly 800 having forty fluid conduits 810, a body portion 820 from which the conduits 810 radially extend, a tubing 830 at a proximal end of the body portion 820 and a clamp interface 840 and an opposing distal end of the body portion 820. The forty fluid conduits 810 are arranged in equally spaced sets of ten conduits per side of a rectangular shaped body portion 820. Between a spacing of each conduit 810 at a point of engagement on the body portion 820, an internal recess 850 is defined therein. The internal recesses 850 are sized for a hook or other stretching fixture (e.g., fixture 400) to engage the internal recesses 850 and radially stretch the body portion 820 from an unelongated state into an elongated state and subsequently pull a mandrel internally therefrom to remove the mandrel with one or more protrusions from the fluid transfer assembly 800. The hook (not shown) is thus a different stretching fixture than that illustrated in FIGS. 12 and 13. A fluid transfer assembly with multiple (e.g., hundreds) of conduits may be manufactured with such a method.

Figure 20:
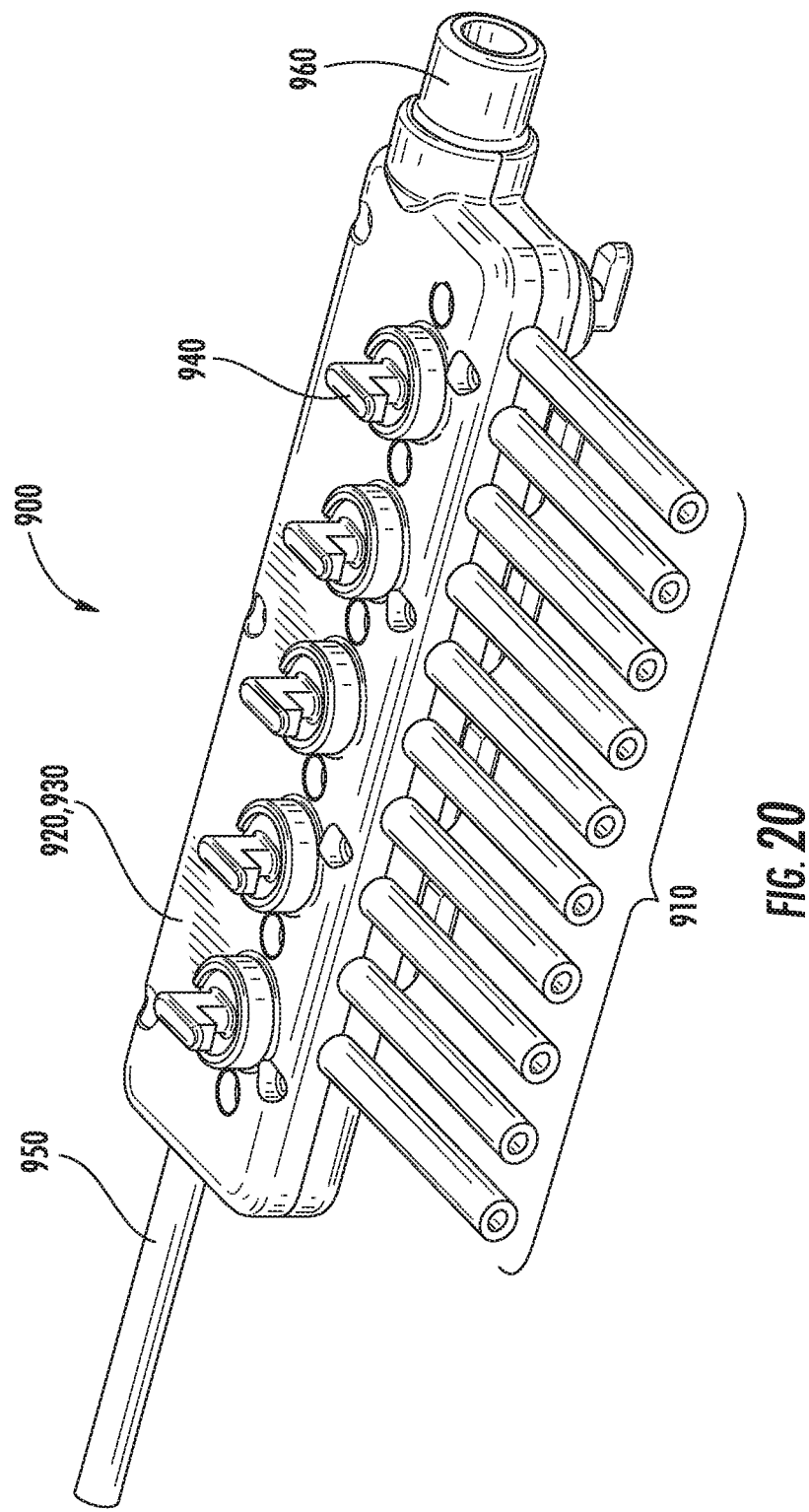
FIG. 20 is a perspective view of a fluid transfer assembly with multiple fluid transfer conduits, a housing, and fluid control devices.

FIG. 20 illustrates an exemplary fluid transfer assembly 900 having ten fluid conduits 910, a rectangular shaped body portion 920, a housing 930, five valves 940, a tubing 950, and a clamp interface 960. The ten fluid conduits 910 are disposed only on a single side of the body portion 920.

Figure 21:
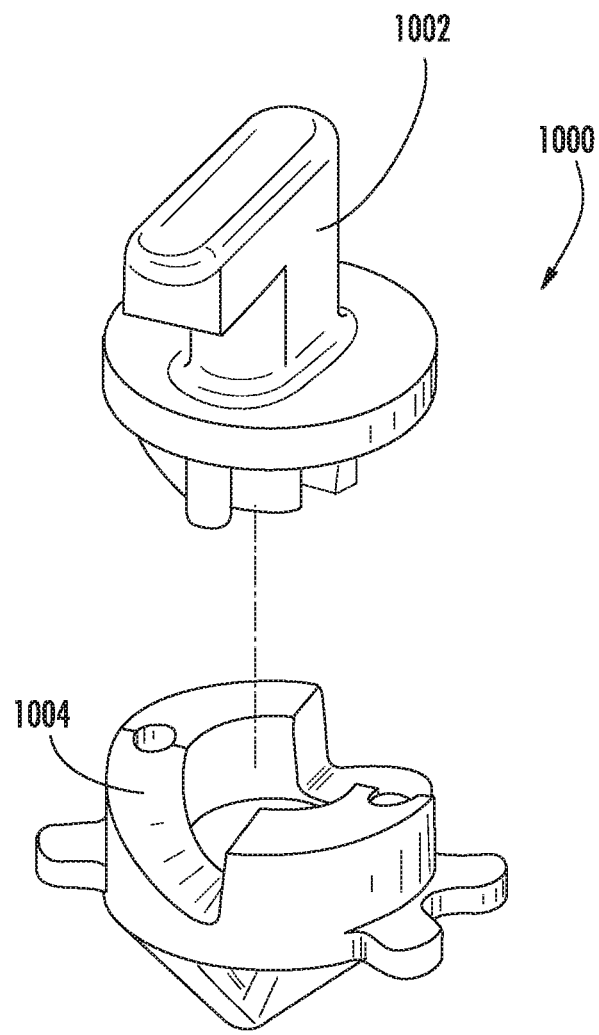
FIG. 21 is an exploded perspective view of a fluid control device.

FIG. 21 illustrates a detailed view of a fluid control device or valve 1000 as described above in reference to FIG. 1. The valve 1000 comprises a handle 1002 is shaped as an "anvil" that is rotatable within an inclined bore 1004 provided within a housing. In some aspects, for example, the inclined bore 1004 comprises a wedge shaped protrusion provided at a bottom thereof. In this manner, rotation of the handle 1002 clockwise or counterclockwise applies pressure to the conduit (e.g., 110) with which the valve 1000 is engaged in order to obstruct or remove such obstruction from the fluid flow of the fluid channel. In some aspects, the valve 1000 is a pinch valve. In other aspects, the fluid control device may be provided within a body of the fluid transfer assembly using, for example, a hemispherically tipped pinch element.

Figure 22:
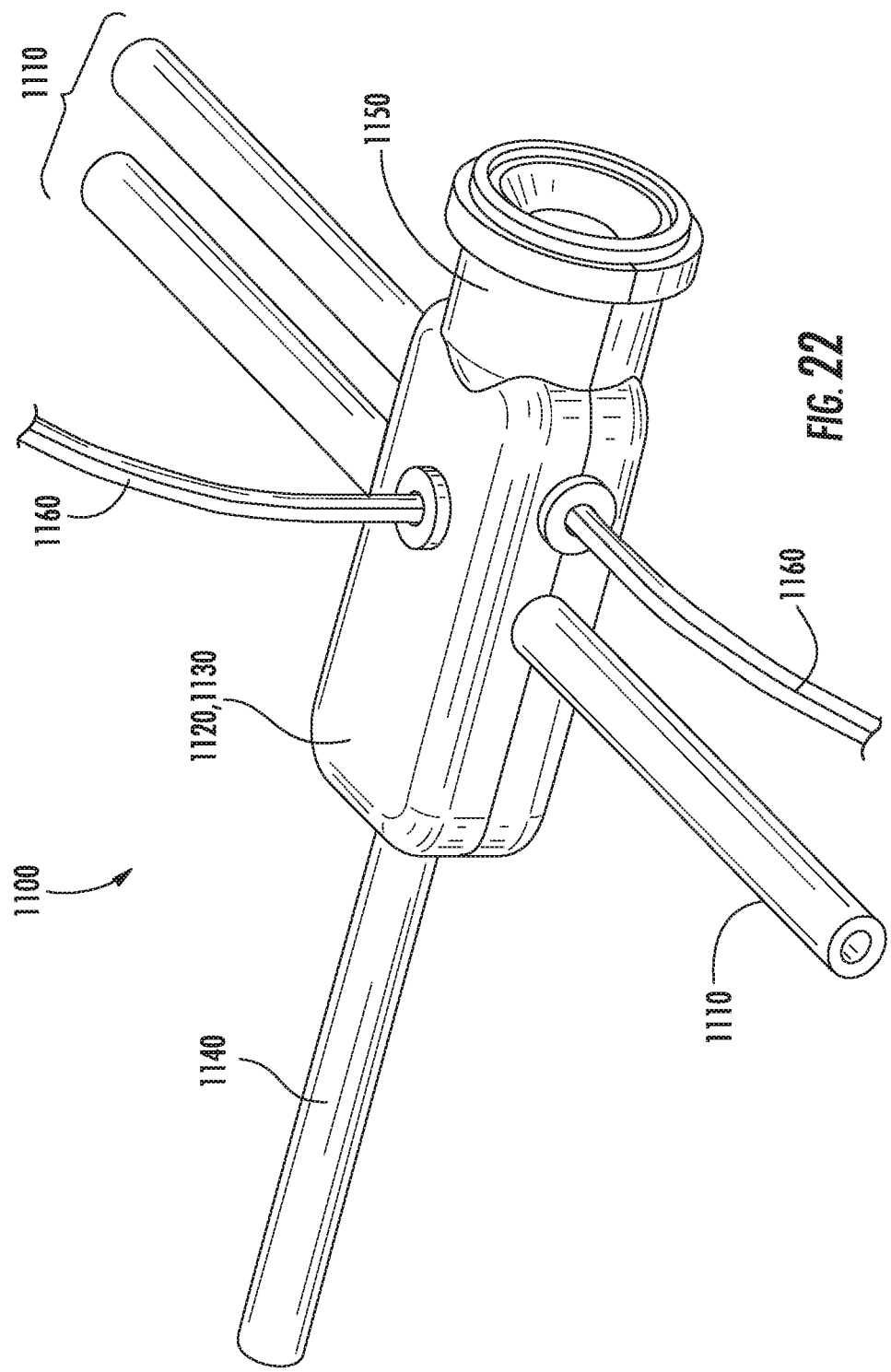
FIG. 22 is a perspective view of a fluid transfer assembly with multiple fluid transfer conduits, a housing, and sensors.

FIG. 22 illustrates an exemplary fluid transfer assembly 1100 having three fluid conduits 1110, a rectangular shaped body portion 1120, a housing 1130, a tubing 1140, a clamp interface 1150, and two sensing mechanisms or sensors 1160. The three fluid conduits 1110 are disposed in an uneven disposition, with two fluid conduits 1110 being disposed on one side of the rectangular shaped body portion 1120 and the third fluid conduit 1110 being positioned on an opposing side of the body portion 1120. One of the two sensors 1160 is disposed adjacent the third fluid conduit 1110, while the remaining sensor 1160 extends from a top surface of the housing 1130. The sensors 1160 are configurable to measure or determine temperature, pH, pressure, cell density, perform optical inspection, etc., of the fluid flow within the fluid channel defined within the fluid transfer assembly. In some alternative aspects, not shown, the sensors 1160 are configured as optical fibers for remote sensing.

Figure 23:
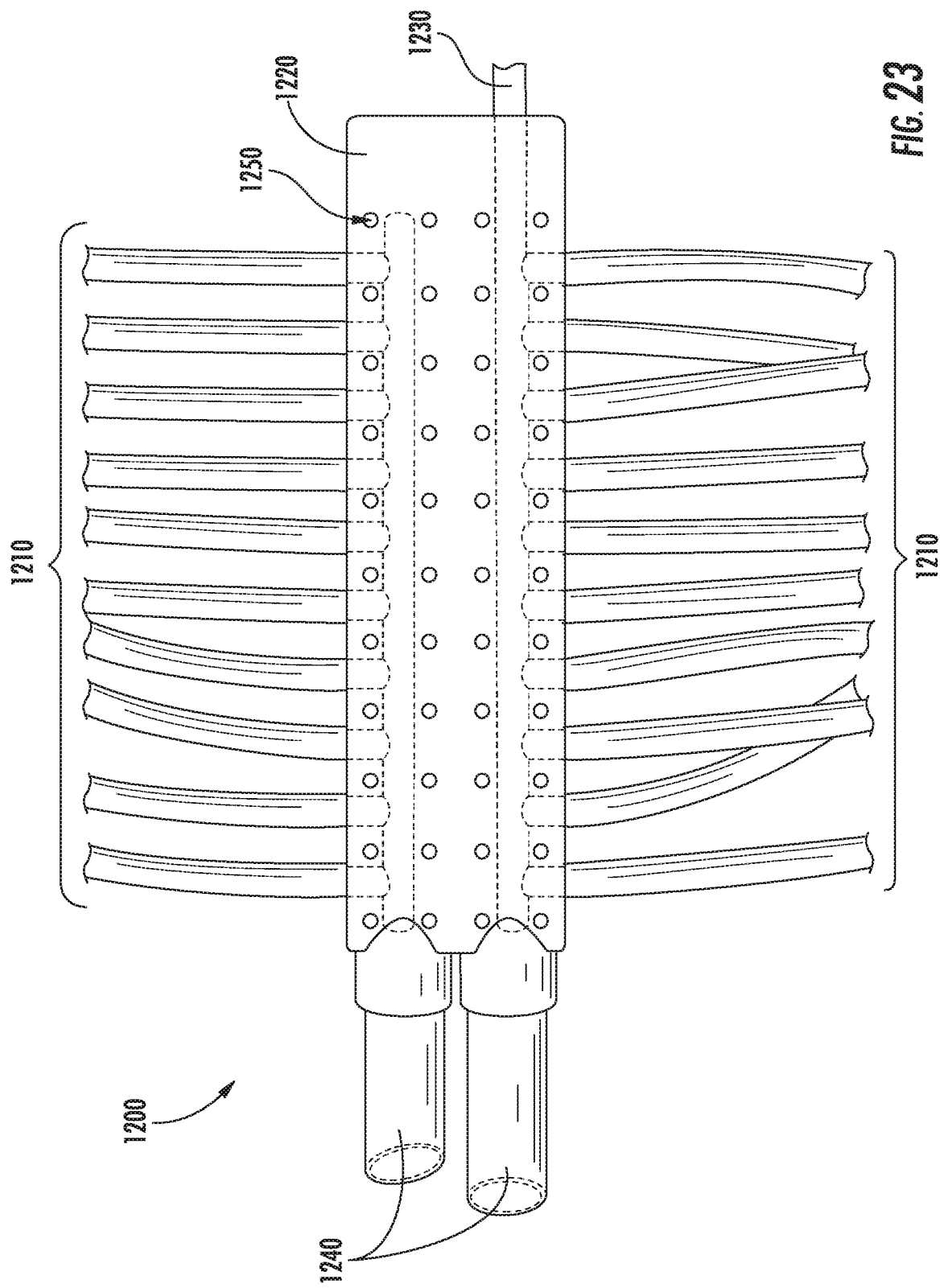
FIG. 23 is a fluid transfer assembly with two separate fluid pathways within the body and multiple fluid transfer conduits extending from each fluid pathway within the body.

FIG. 23 illustrates an exemplary fluid transfer assembly 1200 having two independent fluid channels or pathways defined therein. Each of the fluid channels is in fluid communication with ten fluid conduits 1210, such that the fluid transfer assembly comprises 20 fluid conduits in total. The fluid transfer assembly comprises a rectangular body portion 1220, a tubing 1230, two tube stubs 1240, and a plurality of internal recesses 1250. The 20 fluid conduits 1210 are disposed in ten sets of two conduits each on opposing sides of the rectangular shaped body 1220. Notably, the two tube stubs 1240 provide independent and separate outlets for the separate fluid transfer assemblies provided within the fluid transfer assembly 1200. Otherwise, the structure designated 1240 could also be representative of a clamp interface.

Figure 24:
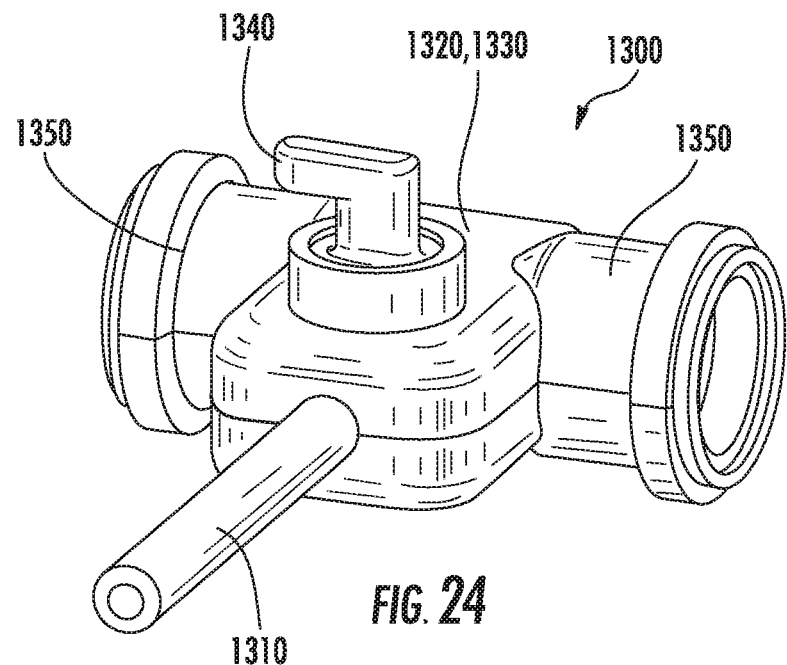
FIG. 24 is a perspective view of a fluid transfer assembly with a single fluid transfer conduit, a housing, and a fluid control device.
Figure 25:
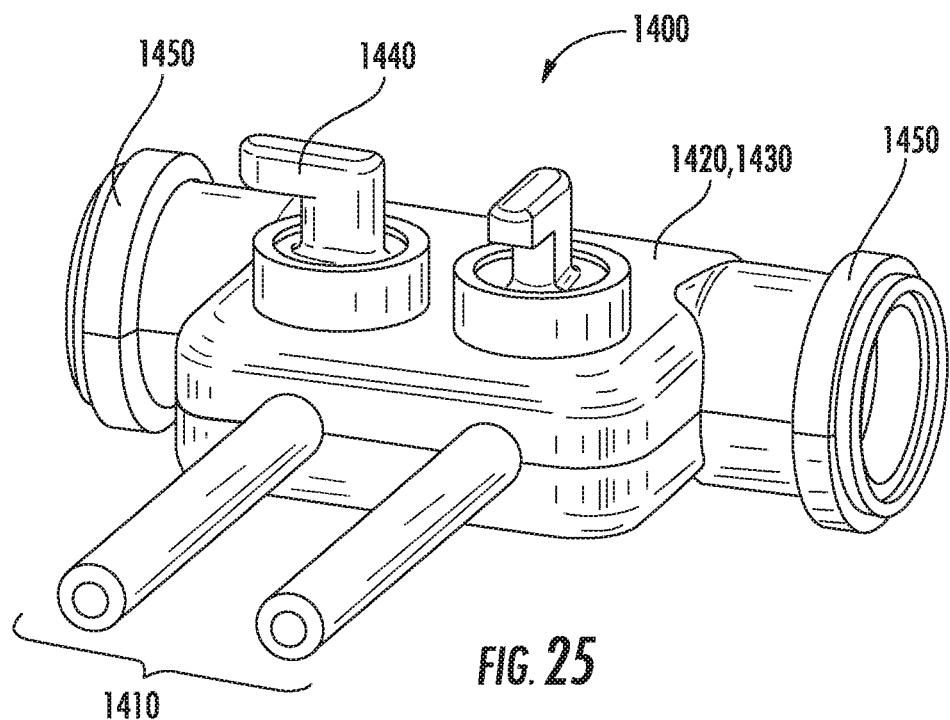
FIG. 25 is a perspective view of a fluid transfer assembly with multiple fluid transfer conduits, a housing, and fluid control devices.

FIG. 24 illustrates an exemplary fluid transfer assembly 1300 having one fluid conduit 1310, a square-shaped body portion 1320, a housing 1330, a valve 1340, and two clamps 1350. FIG. 25 illustrates an exemplary fluid transfer assembly 1400 having two fluid conduits 1410, a rectangular shaped body portion 1420, a housing 1430, two valves 1440, and two clamps 1450. The two fluid conduits 1410 are provided on a same side of the body portion 1420.

Figure 26:
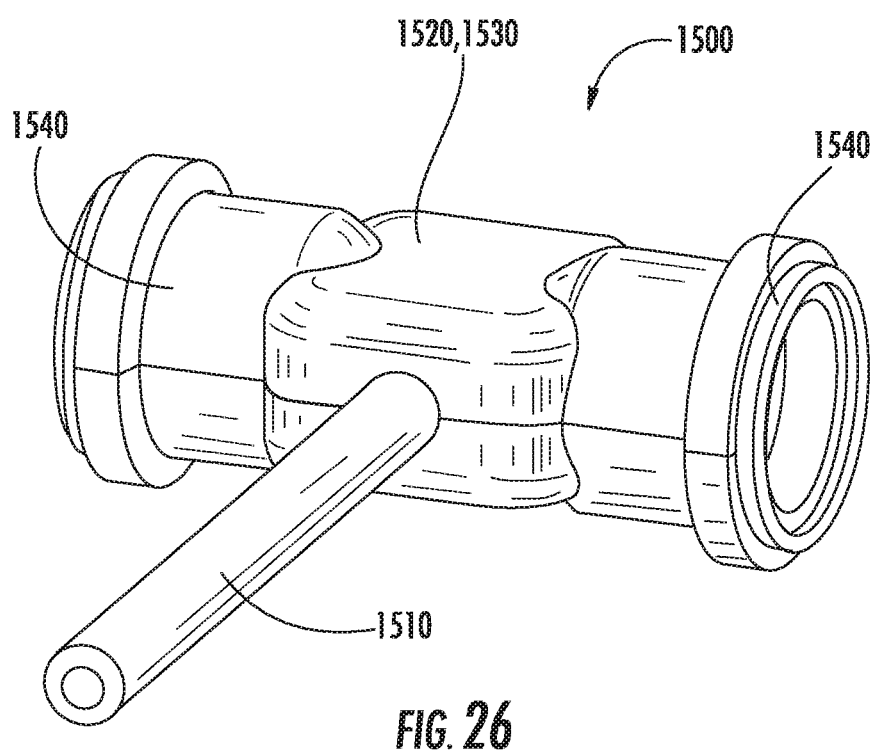
FIG. 26 is a perspective view of a fluid transfer assembly with a single fluid transfer conduit and a housing.
Figure 27:
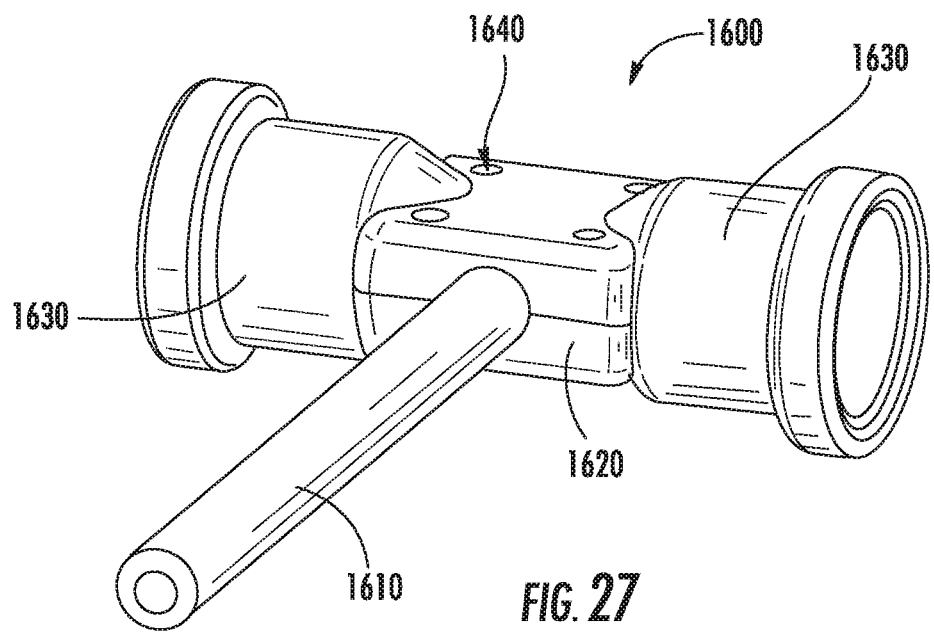
FIG. 27 is a perspective view of a fluid transfer assembly with a single fluid transfer conduit.
Figure 28:
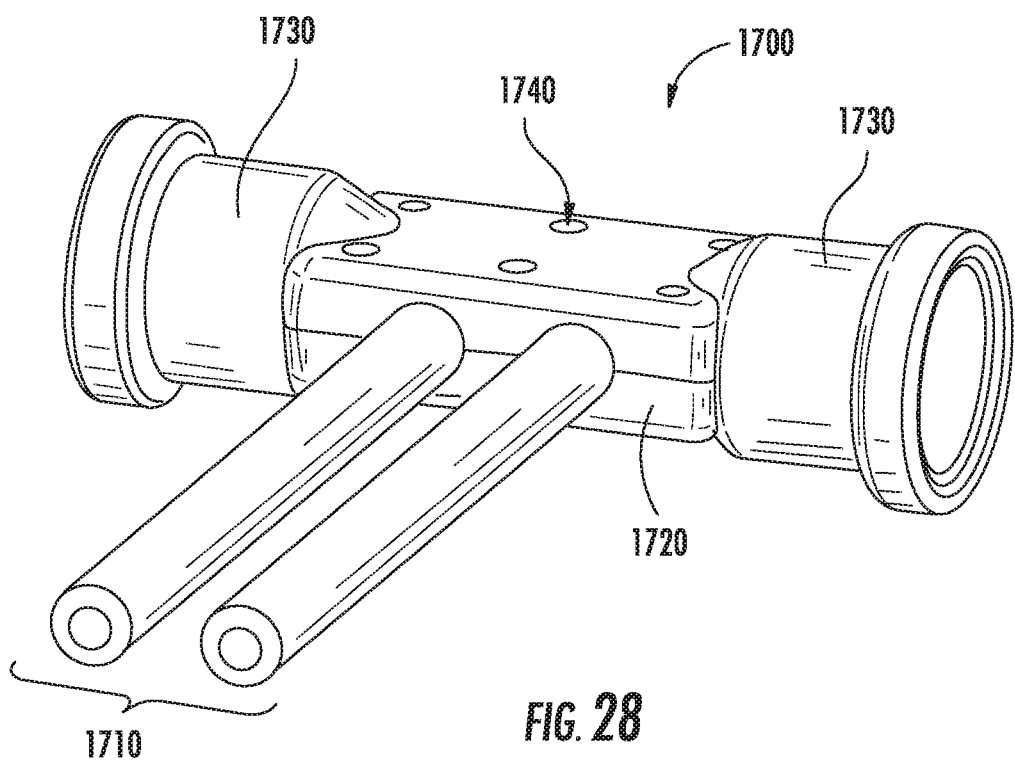
FIG. 28 is a perspective view of a fluid transfer assembly with multiple fluid transfer conduits.

FIG. 26 illustrates an exemplary fluid transfer assembly 1500 having one fluid conduit 1510, a square-shaped body portion 1520, a housing 1530, and two clamps 1540. FIG. 27 illustrates an exemplary fluid transfer assembly 1600 having one fluid conduit 1610, a square-shaped body portion 1620, two clamps 1630, and four internal recesses 1640. FIG. 28 illustrates an exemplary fluid transfer assembly 1700 having two fluid conduits 1710, a rectangular shaped body portion 1720, two clamps 1730, and six internal recesses 1740. The two fluid conduits 1710 are disposed on a same side of the body portion 1720.

Figure 29:
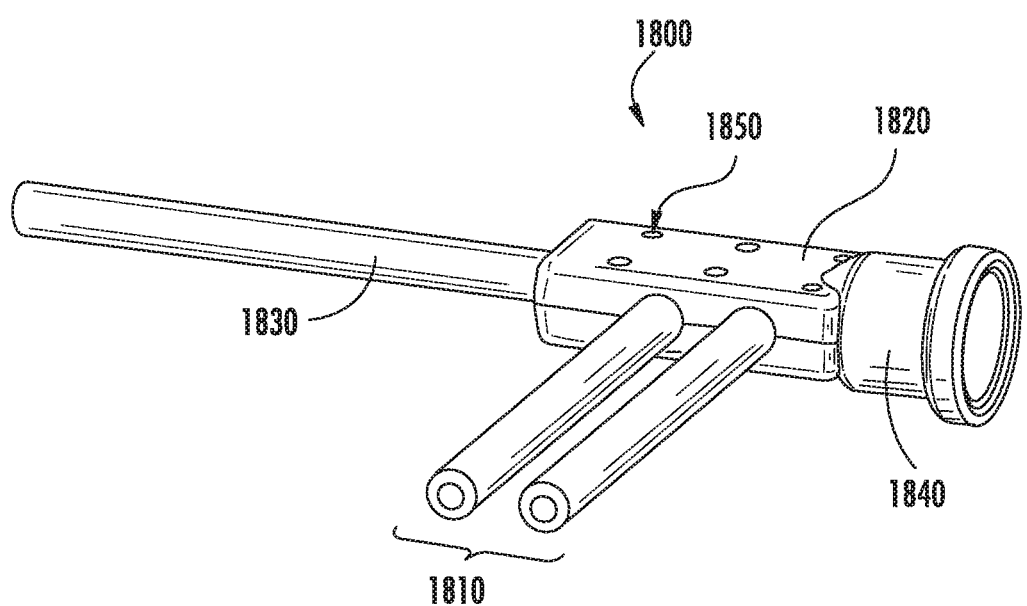
FIG. 29 is a perspective view of a fluid transfer assembly with multiple fluid transfer conduits.

FIG. 29 illustrates an exemplary fluid transfer assembly 1800 having two fluid conduits 1810, a rectangular shaped body portion 1820, a tubing 1830, a clamp interface 1840, and six internal recesses 1850. The two fluid conduits 1810 are disposed on a same side of the body portion 1820.

Figure 30:
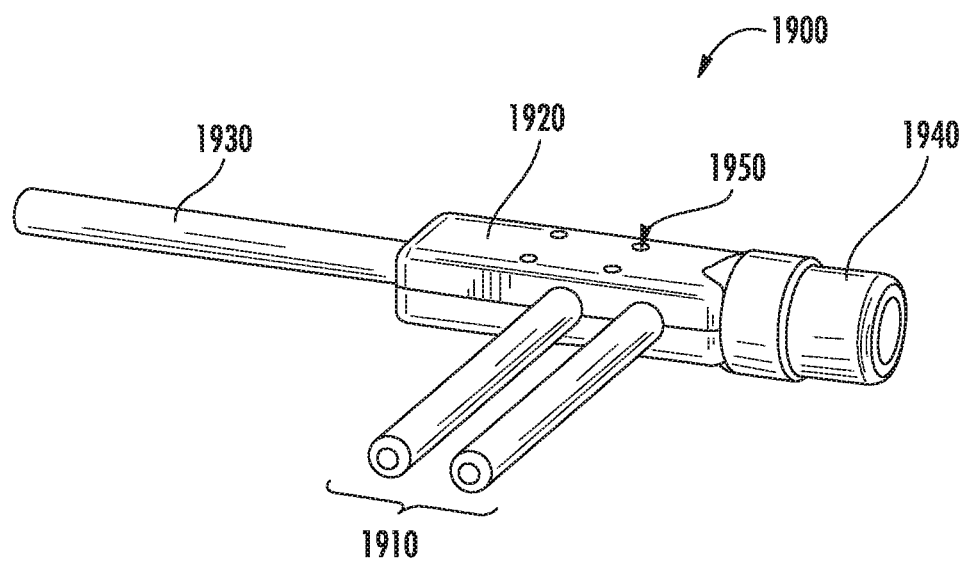
FIG. 30 is a perspective view of a fluid transfer assembly with multiple fluid transfer conduits.
Figure 31:
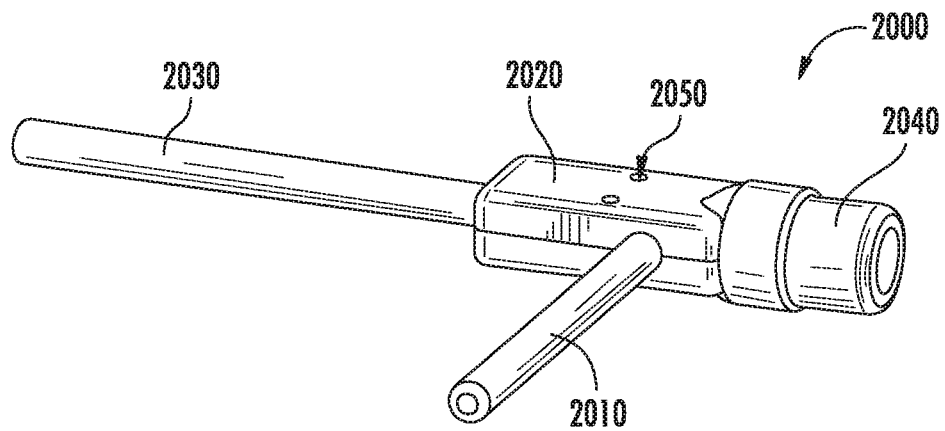
FIG. 31 is a perspective view of a fluid transfer assembly with a single fluid transfer conduit.

FIG. 30 illustrates an exemplary fluid transfer assembly 1900 having two fluid conduits 1910, a rectangular shaped body 1920, a tubing 1930, a clamp interface 1940, and four internal recesses 1950. The two fluid conduits 1910 are disposed on a same side of the body portion 1920. FIG. 31 illustrates an exemplary fluid transfer assembly 2000 having one fluid conduit 2010, a rectangular shaped body 2020, a tubing 2030, a tube stub 2040, and two internal recesses 2050.

As such, the fluid transfer assemblies described herein may comprise any number of conduits, any size or shape body portions, any number of valves, any number or type of tubings, any number or type of fluid control devices, any number of clamps, and/or any number of internal recesses. A disposition and/or placement of any of these elements of the fluid transfer assembly are contemplated by this disclosure and shown by the numerous exemplary embodiments provided herein.

The fluid transfer assembly, system, and related method disclosed herein are low cost and single-use but still capable of effectuating a substantially aseptic seal to a vessel while still allowing maximum flexibility. In addition, the related method provides a method for forming a fluid transfer assembly of relatively few components all while maintaining a substantially aseptic assembly in which the fluid may flow.

The fluid transfer assemblies disclosed herein may be assembled and then the entire devices or components thereof may be rendered substantially aseptic by, for example, gamma radiation. Alternatively, the entire devices or components thereof may be rendered substantially aseptic by exposure to steam above 121° C. for a period of time long enough to eliminate microorganisms. The entire devices or components thereof may also be rendered aseptic by chemical treatment, such as with ethylene oxide (ETO). Once rendered substantially aseptic, the fluid transfer assemblies may be appropriately packaged and stored to maintain the substantially aseptic state until ready for use.

The aforementioned fluid transfer assemblies are particularly useful when the vessel from which fluid is being transferred is a bioreactor bag. Such fluid transfer assemblies, combined with a bioreactor bag, may be used in single-use bioreactors, such as the BIOSTAT® STR available from Sartorius. Fluid conduits may be sized to accommodate high density cell culture applications and provide a sterile, low-cost manner of collecting samples from bioreactor bags without the risk of leakage. As discussed above, the fluid transfer assemblies provided herein may be connected to a variety of sample vessels or additional fluid transfer assemblies.

The fluid transfer assemblies and/or systems as well as a primary vessel (such as the bioreactor bag), may be rendered substantially aseptic by the methods described above or others known in the art. Once rendered aseptic, the entire fluid transfer assembly or system may be aseptically packaged and distributed for use. An end user may open and utilize a completely closed and substantially aseptic system without risk of leaks due to the barbed or luer connectors extending from a bioreactor vessel. The foregoing descriptions of fluid transfer assemblies, fluid transfer systems, and related methods illustrate and describe various embodiments. As various changes can be made in the above embodiments without departing from the scope of the invention disclosed and claimed herein, it is intended that all matter contained in the above description or shown in the accompanying figures shall be interpreted as illustrative and not limiting. Furthermore, the scope of the invention covers various modifications, combinations, alterations, etc., of the above-described embodiments that all are within the scope of the claims. Additionally, the disclosure shows and describes only selected embodiments of the invention, but the invention is capable of use in various other combinations, modifications, and environments and is capable of changes or modifications within the scope of the inventive concept as expressed herein, commensurate with the above teachings, and/or within the skill or knowledge of artisans in the relevant art. Furthermore, certain features and characteristics of each embodiment may be selectively interchanged and applied to other illustrated and non-illustrated embodiments of the invention without departing from the scope of the invention.

The invention claimed is:

1. A method of forming a fluid transfer assembly comprising:
engaging one or more protrusions extending outwardly from a mandrel with one or more fluid conduits, the one or more protrusions extending from the mandrel in a direction away from a longitudinal axis of the mandrel;
positioning the mandrel with the one or more protrusions engaging the conduits into a mold;
introducing a polymeric material into the mold to substantially surround the mandrel and at least a portion of the conduits engaged with the one or more protrusions;

solidifying the polymeric material in the mold to define a fluid transfer assembly comprising a body portion engaged with the conduits;

removing the fluid transfer assembly from the mold;

stretching the body portion into an elongated state;

removing the mandrel with the one or more protrusions extending therefrom from the fluid transfer assembly; and relaxing the body portion into an unelongated state from the elongated state such that a fluid channel in fluid communication with the one or more conduits is formed within the body portion.

2. The method of claim 1, further comprising attaching a collar around an end of at least one of the one or more fluid conduits prior to the step of introducing the polymeric material.

3. The method of claim 2, wherein the polymeric material of the body portion is introduced in order to at least partially cover the collar.

4. The method of claim 3, wherein the polymeric material of the body portion is introduced in order to substantially entirely cover the collar.

5. The method of claim 2, wherein the at least one of the one or more fluid conduits is a thermoplastic conduit, and the polymeric material is a thermoset, wherein the collar is configured to attach the thermoplastic conduit into the thermoset body portion.

6. The method of claim 2, wherein the at least one of the one or more fluid conduits is a thermoplastic conduit, and the polymeric material is a thermoplastic, wherein the collar is configured to attach the thermoplastic conduit into the thermoplastic body portion.

7. The method of claim 2, wherein the at least one of the one or more fluid conduits is a thermoset conduit, and the polymeric material is a thermoplastic, wherein the collar is configured to attach the thermoset conduit into the thermoplastic body portion.

8. The method of claim 2, wherein the at least one of the one or more fluid conduits is a thermoset conduit, and the polymeric material is a thermoset, wherein the collar is configured to attach the thermoset conduit into the thermoset body portion.

9. The method of claim 2, further comprising providing an adhesive between the collar and the fluid conduit.

10. The method of claim 9, wherein the fluid conduit is a thermoset material.

11. The method of claim 9, wherein the fluid conduit is a thermoplastic material.

12. The method of claim 2, further comprising applying a primer to an exterior of the collar.

13. The method of claim 1, wherein solidifying the polymeric material comprises curing the polymeric material having an elongation to break of between about 150% and about 1,500%.

14. The method of claim 1, wherein the one or more protrusions comprise a length less than or equal to a diameter of the mandrel.

15. The method of claim 1, wherein the polymeric material is a thermoplastic.

16. The method of claim 1, wherein the polymeric material is a thermoset.

17. The method of claim 1, wherein the polymeric material is a silicone elastomer.

18. The method of claim 1, wherein the polymeric material is a perfluoropolyether elastomer.

19. The method of claim 1, comprising securing at least a portion of the fluid transfer assembly into a rigid housing.

20. The method of claim 19, wherein a material of the rigid housing is selected from the group consisting of polysulfone, polyether sulfone, polyester, polycarbonate, polyamide, polyetherimide, polyether ether ketone, polyolefins, ethylene tetrafluoro ethylene, cyanate ester, aluminum, stainless steel, carbon fiber epoxy, and glass filled plastics.

21. The method of claim 1, comprising engaging one or more fluid control devices with at least one of the conduits and the body portion to control fluid flow within the fluid transfer assembly.

22. A method of forming a fluid transfer assembly comprising:

engaging one or more protrusions extending outwardly from a mandrel with one or more fluid conduits;

positioning the mandrel with the one or more protrusions engaging the conduits into a mold;

introducing a polymeric material into the mold to substantially surround the mandrel and at least a portion of the conduits engaged with the one or more protrusions;

solidifying the polymeric material in the mold to define a fluid transfer assembly comprising a body portion engaged with the conduits;

removing the fluid transfer assembly from the mold;

stretching the body portion into an elongated state via one or more internal recesses defined by the body portion that enable the body portion to be stretched from an unelongated state into the elongated state;

removing the mandrel with the one or more protrusions from the fluid transfer assembly by pulling the mandrel to remove the mandrel with the one or more protrusions from the fluid transfer assembly with the body portion in the elongated state; and relaxing the body portion into the unelongated state from the elongated state such that a fluid channel in fluid communication with the one or more conduits is formed within the body portion.

23. The method of claim 22, comprising positioning sleeves in the mold prior to introducing the polymeric material into the mold, the sleeves defining the one or more internal recesses in the body portion upon removing the fluid transfer assembly from the mold.

* * * * *